United States Patent
Chappell et al.

(10) Patent No.: US 12,130,915 B2
(45) Date of Patent: Oct. 29, 2024

(54) MICROARCHITECTURAL MECHANISMS FOR THE PREVENTION OF SIDE-CHANNEL ATTACKS USING A THREAD IDENTIFICATION (TID) AND A PRIVILEGE LEVEL BIT

(71) Applicant: Intel Corporation, Santa Clara, CA (US)

(72) Inventors: Robert S. Chappell, Portland, OR (US); Jared W. Stark, IV, Portland, OR (US); Joseph Nuzman, Haifa (IL); Stephen Robinson, Austin, TX (US); Jason W. Brandt, Austin, TX (US)

(73) Assignee: Intel CORPORATION, Santa Clara, CA (US)

( * ) Notice: Subject to any disclaimer, the term of this patent is extended or adjusted under 35 U.S.C. 154(b) by 0 days.

(21) Appl. No.: 17/590,470

(22) Filed: Feb. 1, 2022

(65) Prior Publication Data

US 2022/0335126 A1   Oct. 20, 2022

Related U.S. Application Data

(63) Continuation of application No. 16/456,578, filed on Jun. 28, 2019, now Pat. No. 11,238,155.

(Continued)

(51) Int. Cl.
  *G06F 9/30* (2018.01)
  *G06F 9/38* (2018.01)
(Continued)

(52) U.S. Cl.
  CPC ........ *G06F 21/556* (2013.01); *G06F 9/30116* (2013.01); *G06F 9/30123* (2013.01);
(Continued)

(58) Field of Classification Search
  CPC .. G06F 9/30116; G06F 9/3806; G06F 9/3808; G06F 9/3842; G06F 9/3844; G06F 9/30123
  See application file for complete search history.

(56) References Cited

U.S. PATENT DOCUMENTS

| 10,108,554 B2 | 10/2018 | Chan et al. | |
| 2004/0215720 A1* | 10/2004 | Alexander | G06F 9/3806 709/204 |

(Continued)

OTHER PUBLICATIONS

Notice of Allowance, U.S. Appl. No. 16/456,578, Sep. 24, 2021, 11 pages.

*Primary Examiner* — Jacob Petranek
(74) *Attorney, Agent, or Firm* — NICHOLSON DE VOS WEBSTER & ELLIOTT LLP

(57) ABSTRACT

Systems, methods, and apparatuses relating to microarchitectural mechanisms for the prevention of side-channel attacks are disclosed herein. In one embodiment, a processor core includes an instruction fetch circuit to fetch instructions; a branch target buffer comprising a plurality of entries that each include a thread identification (TID) and a privilege level bit; and a branch predictor, coupled to the instruction fetch circuit and the branch target buffer, to predict a target instruction corresponding to a branch instruction based on at least one entry of the plurality of entries in the branch target buffer, and cause the target instruction to be fetched by the instruction fetch circuit.

24 Claims, 23 Drawing Sheets

| CONTEXT SIGNATURE 201 ||| PHYSICAL CONTEXT 209 | FOOTPRINT (NUMBER OF HITS, REPLACEMENT, SIZE, ETC.) 211 | ACTIVE 213 |
|---|---|---|---|---|---|
| HARDWARE THREAD ID 203 | CR3 VALUE 205 | RING LEVEL 207 | | | |
| 0 | A | 1 | 0 | | 0 |
| 0 | B | 0 | 2 | | 0 |
| 0 | C | 1 | 3 | | 0 |
| 1 | A | 1 | 1 | | 1 |

Related U.S. Application Data

(60) Provisional application No. 62/691,511, filed on Jun. 28, 2018.

(51) Int. Cl.
*G06F 9/48* (2006.01)
*G06F 12/0802* (2016.01)
*G06F 21/55* (2013.01)
*G06F 21/62* (2013.01)

(52) U.S. Cl.
CPC ........ *G06F 9/30196* (2013.01); *G06F 9/3806* (2013.01); *G06F 9/3808* (2013.01); *G06F 9/3842* (2013.01); *G06F 9/3844* (2013.01); *G06F 9/4881* (2013.01); *G06F 12/0802* (2013.01); *G06F 21/62* (2013.01)

(56) References Cited

U.S. PATENT DOCUMENTS

| | | |
|---|---|---|
| 2014/0033297 A1 | 1/2014 | Beals et al. |
| 2014/0223141 A1 | 8/2014 | Combs et al. |
| 2017/0147346 A1* | 5/2017 | Hornung ............... G06F 9/3844 |
| 2018/0060073 A1* | 3/2018 | Havlir ................... G06F 9/3806 |
| 2019/0163902 A1 | 5/2019 | Reid et al. |
| 2019/0303161 A1 | 10/2019 | Nassi et al. |
| 2019/0361706 A1 | 11/2019 | Vougioukas et al. |
| 2020/0133673 A1 | 4/2020 | Bouzguarrou et al. |

* cited by examiner

| HARDWARE THREAD ID 203 | CONTEXT SIGNATURE 201 | | PHYSICAL CONTEXT 209 | FOOTPRINT (NUMBER OF HITS, REPLACEMENT, SIZE, ETC.) 211 | ACTIVE 213 |
|---|---|---|---|---|---|
| | CR3 VALUE 205 | RING LEVEL 207 | | | |
| 0 | A | 1 | 0 | | 0 |
| 0 | B | 0 | 2 | | 0 |
| 0 | C | 1 | 3 | | 0 |
| 1 | A | 1 | 1 | | 1 |

FIG. 2

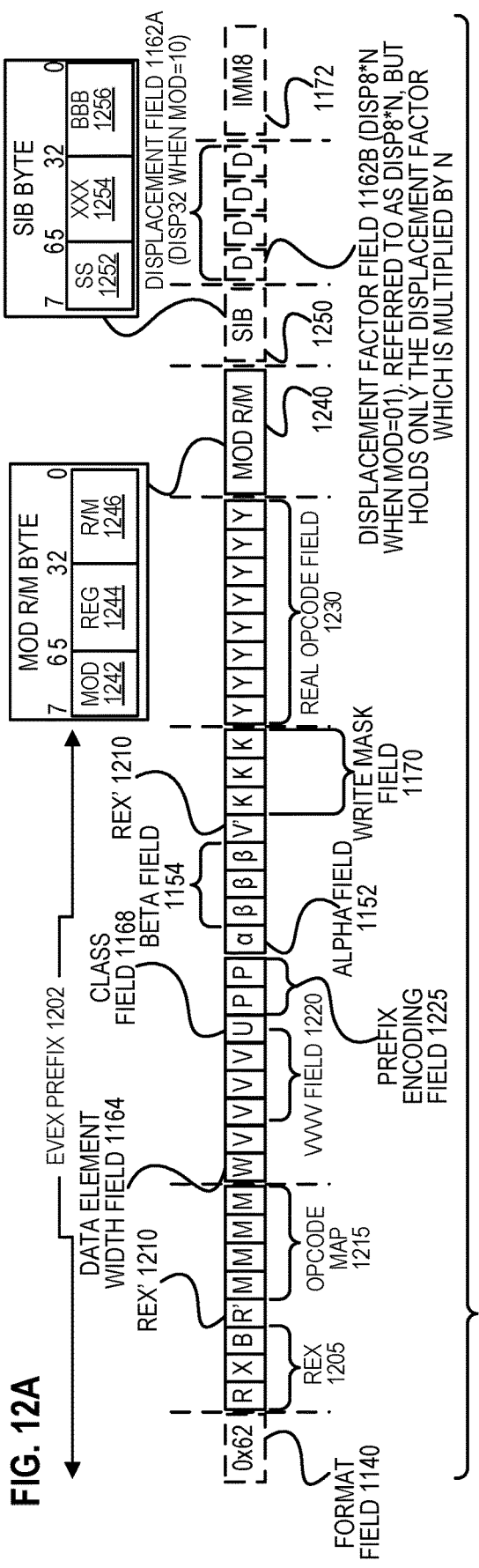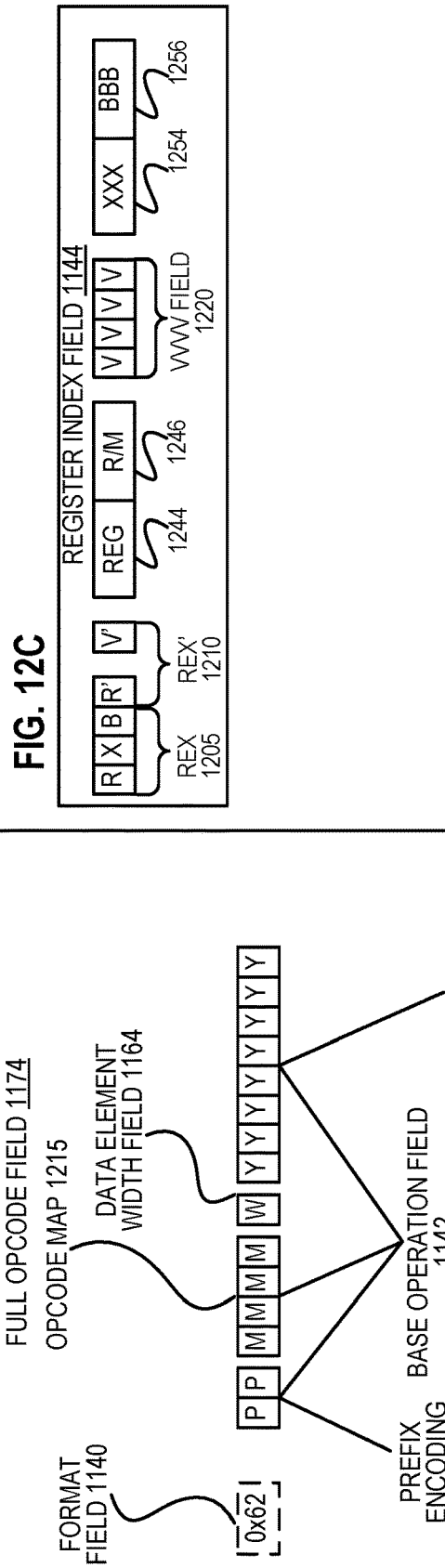

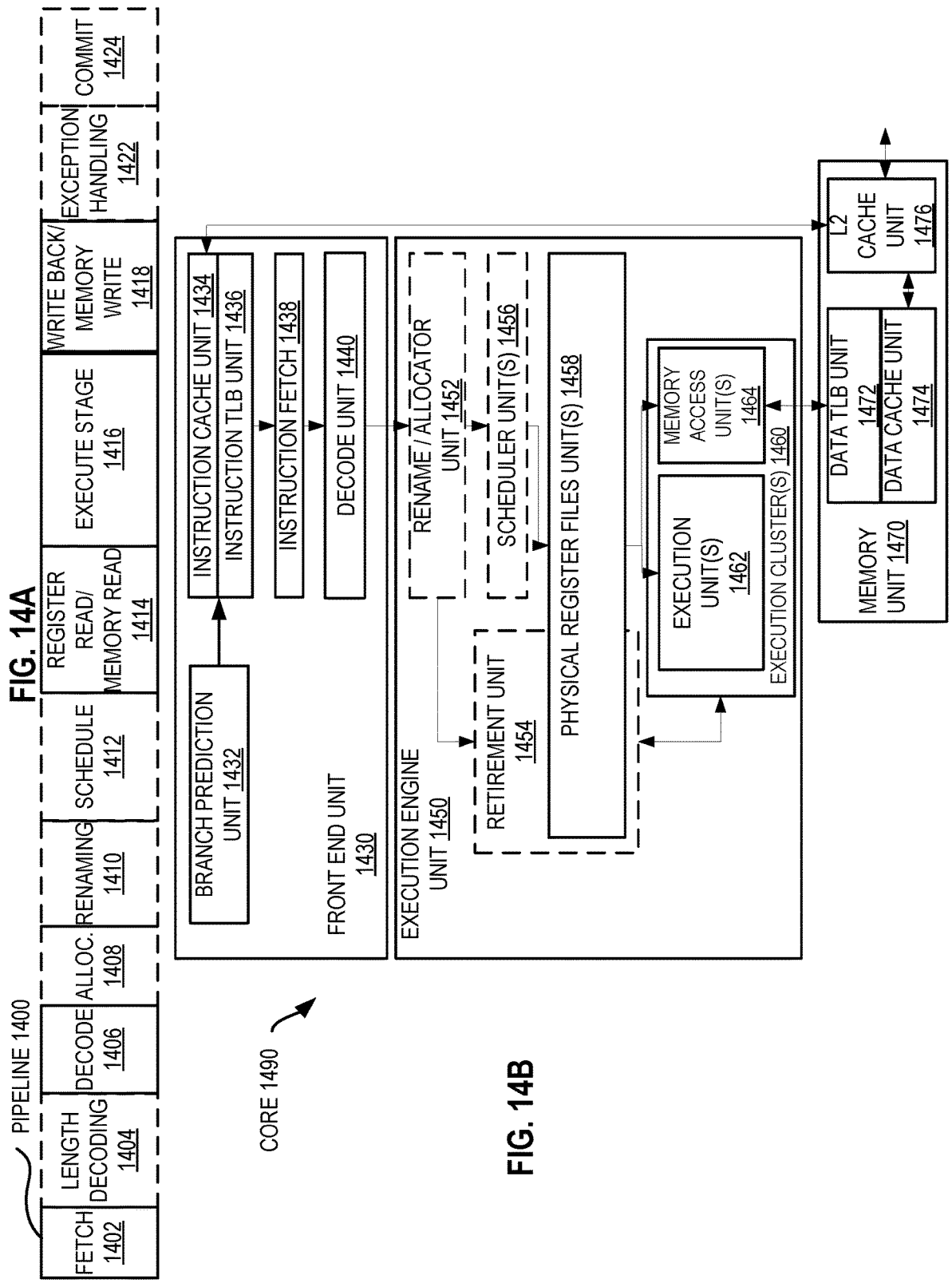

MICROARCHITECTURAL MECHANISMS FOR THE PREVENTION OF SIDE-CHANNEL ATTACKS USING A THREAD IDENTIFICATION (TID) AND A PRIVILEGE LEVEL BIT

CROSS REFERENCE TO RELATED APPLICATION

The present application is a continuation application of U.S. patent application Ser. No. 16/456,578 filed Jun. 28, 2019, now U.S. Pat. No. 11,238,155, which claims the benefit of U.S. Provisional Patent Application Ser. No. 62/691,511 filed Jun. 28, 2018, each of which is hereby incorporated by reference in its entirety.

BACKGROUND

Side-channel attacks are an emergent and growing threat to safe computing. A side-channel attack against a central processing unit (CPU) uses precise measurement of microarchitectural side-effects to infer the values of secret data that otherwise would not be available to an attacker. For example, an attacker can execute code that times the access latency to data caches to gain information about the addresses the victim workload has recently accessed and caused to be cached.

BRIEF DESCRIPTION OF DRAWINGS

Various embodiments in accordance with the present disclosure will be described with reference to the drawings, in which:

FIG. 2 illustrates embodiments of context table mapping a plurality of context signatures to physical contexts.

FIG. 12A is a block diagram illustrating fields for the generic vector friendly instruction formats in FIGS. 11A and 11B according to embodiments of the disclosure.

FIG. 12B is a block diagram illustrating the fields of the specific vector friendly instruction format in FIG. 12A that make up a full opcode field according to one embodiment of the disclosure.

FIG. 12C is a block diagram illustrating the fields of the specific vector friendly instruction format in FIG. 12A that make up a register index field according to one embodiment of the disclosure.

FIG. 14A is a block diagram illustrating both an exemplary in-order pipeline and an exemplary register renaming, out-of-order issue/execution pipeline according to embodiments of the disclosure.

FIG. 14B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
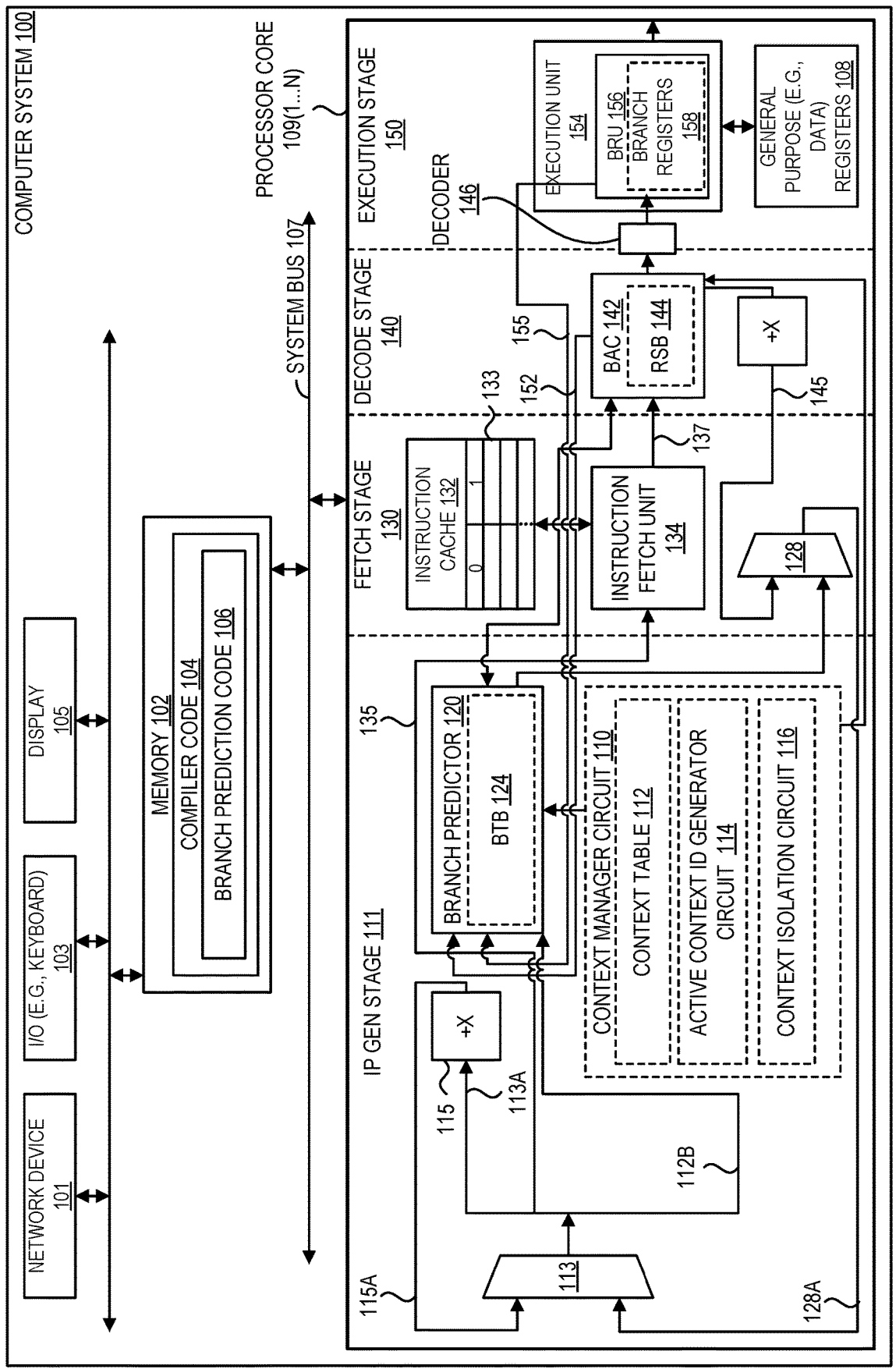
FIG. 1 illustrates a computer system including a processor core according to embodiments of the disclosure.

Various embodiments of methods, apparatus, systems, and non-transitory computer-readable storage media for mechanisms for the prevention of side-channel attacks are described. An attacker can use speculative execution to create microarchitectural side-effects that more profitably reveal secret information from the victim workload. Modern central processing units (CPUs) (e.g., processors) utilize many mechanisms that learn and predict future execution to save processing time. For example, certain CPUs predict the outcomes of conditional branches so that processing can continue in the "shadow" of each branch prior to the calculation of the true outcome. Clever attackers can influence these speculation mechanisms and measure the microarchitectural side-effects created during speculative execution, thereby learning information about the victim even if the victim never architecturally commits the results of the speculative instructions.

Architectural mechanisms exist in many instruction set architectures that can be used to control CPU speculation. These include: 1) serializing instructions to prevent younger instructions from executing speculatively until some or all of the results of older instructions are architecturally committed (for example, LFENCE, CPUID); and 2) non-speculative modes or memory types define execution semantics that prevent speculative execution entirely, such as by fetching and executing instructions one-at-a-time (for example, instructions mapped in uncacheable (UC) memory type).

Further, architectural mechanisms exist that can be used to disrupt side-channel attack measurement. These include: cache flush instructions that evict cached instructions and/or data, preventing measurement by an attacker (for example, WBINVD instruction). Caches may be shared among execution resources (e.g., common) and are a frequent means by which attackers create and measure a side-channel (e.g., a prime-and-probe).

The previous solutions described above were not intended, when developed, to combat speculative side-channel attacks. They operate at a coarse granularity and/or have detrimental performance effects that make them unsuitable for wide deployment. All these methods (e.g., delaying all younger instructions, executing one instruction at a time, or flushing all caches) have a major performance impact on all subsequent instruction execution, regardless of the relevance to handling and protecting secret data.

Embodiments detailed herein include mechanisms that implement context isolation to insulate against information transfer between software entities. Rather than inhibiting speculation using instruction set architecture (ISA) techniques described above or disabling/removing a speculation mechanism, context isolation prevents shared (e.g., prediction and caching) structures from being controlled (e.g., appropriated) by attackers from a different privilege domain. Embodiments covers both context identification and various mechanisms that can be used to enforce isolation efficiently.

Context isolation, as described, preserves the performance of speculation mechanisms by preventing attackers from influencing them easily. A basic approach to context isolation could be replication, but replication is likely too inefficient to be practical. The mechanisms described herein can be used to achieve isolation in different ways, giving an implementer multiple options for the most efficient solution for a given predictor or caching structure.

In some embodiments, context identification is used. "Context" generally refer to any software component that executes with an expectation of protection from another software component. Several ISA constructs exist to provide security protections of one type or another such as privilege levels, paging attributes, etc., but these ISA constructs have not been used to enforce security within microarchitectural speculation mechanisms, such as prediction (for example, branch prediction (BPU)) or caching (for example, a data cache unit (DCU)) structures. Further, contexts in this disclosure are more general in that they may be differentiated by properties that have no attached security assumption.

Contexts can be identified by one or more of the following properties: 1) a hardware thread identifier such as a value that identifies one of multiple logical processors (e.g., logical cores) implemented on the same physical core through techniques such as simultaneous multithreading (SMT); 2) a privilege level such as implemented by rings; 3) page table base address or code segment configuration such as implemented in a control register (e.g., CR3) or code segment (CS) register; 4) address space identifiers (ASIDs) such as implemented by Process Context ID (PCID) or Virtual Process ID (VPID) that semantically differentiate the virtual-to-physical mappings in use by the CPU; 5) key registers that contain cryptographically sealed assets (e.g., tokens) used for determination of privilege of the executing software; 6) a software mode identifier within an address space, for example, a protection key (PKRU value); and/or 7) ephemeral—a context change such as a random reset of context.

Over any non-trivial period of time, many contexts may be active within a physical CPU. In certain embodiments, system software time-slices between applications and system software functions, potentially allowing many contexts access to microarchitectural prediction and caching mechanisms. Replication of such structures to achieve isolation is impractical. Flushing all such structures on context transition is impractical in that doing so compromises temporal locality that is retained across transitions.

In some embodiments, context remapping is used. Context remapping enables a CPU (or core of a CPU) to: 1) maintain multiple unique states associated with many contexts simultaneously, and 2) switch active contexts among those tracked by the CPU. To achieve this, certain embodiments of a CPU support multiple physical contexts that are used to identify and differentiate state internally. In one embodiment, the CPU dynamically assigns these physical contexts to virtual contexts identified by a set of properties as described herein. A context table (or other structure) is used to store this mapping. The combination of context properties that uniquely identifies a context for remapping is generally referred to as a context signature. In some embodiments, this context table is maintained by a page miss handler (PMH) of a translation lookaside buffer (TLB). In some embodiments, this context table is maintained by a context manager circuit. In certain embodiments, there are more virtual contexts than physical contexts. In certain embodiments, there is a direct mapping from the context signature to the physical context ID (e.g., a one to one mapping between virtual context IDs and physical context IDs).

FIG. 1 illustrates a computer system 100 including a processor core 109 according to embodiments of the disclosure. Processor core 109 includes multiple components (e.g., microarchitectural prediction and caching mechanisms) that may be shared by multiple contexts. For example, branch target buffer (BTB) 124, instruction cache 132, and/or return stack buffer (RSB) 144 may be shared by multiple contexts. Certain embodiments include a context manager circuit 110 to maintain multiple unique states associated with a plurality of contexts simultaneously, and switch active contexts among those tracked by the context manager circuit. Context manager circuit 110 may include a context table 112 (e.g., as an instance of context table 200 in FIG. 2), active context ID generator circuit 114 (e.g., as an instance of active context ID generator circuit 300 in FIG. 3), and/or context isolation circuit 116 (e.g., as an instance of context isolation circuit 400 in FIG. 4, context isolation circuit 500 in FIG. 5, or context isolation circuit 800 in FIG. 8). In one embodiment, an active context ID generator causes microcode to execute to generate the active context ID value. In one embodiment, an address (for example, the address into the shared component, e.g., branch target buffer (BTB) 124, instruction cache 132, or return stack buffer (RSB) 144) is combined with information from the context manager circuit (e.g., a key, index, etc.) to isolate context(s) from other context(s). For example, an active context ID may be generated by active context ID generator circuit 114 and combined with the address and both used to access the desired information (e.g., via context isolation circuit 116). In one embodiment, context isolation circuit 116 performs or causes the access to the desired information (e.g., but only the information for a particular context). In certain embodiments, context manager circuit 110 (e.g., context isolation circuit 116) isolates contexts by using strict partitioning, competitive sharing (e.g., context tagging), value encryption, or index/tag hashing (e.g., as discussed below).

Depicted computer system 100 includes a branch predictor 120 and a branch address calculator 142 (BAC) in a pipelined processor core 109(1)-109(N) according to embodiments of the disclosure. Referring to FIG. 1, a pipelined processor core (e.g., 109(1)) includes an instruction pointer generation (IP Gen) stage 111, a fetch stage 130, a decode stage 140, and an execution stage 150. In one embodiment, computer system 100 (e.g., processor) includes multiple cores 109(1-N), where N is any positive integer. In another embodiment, computer system 100 (e.g., processor) includes a single core. In certain embodiments, each processor core 109(1-N) instance supports multithreading (e.g., executing two or more parallel sets of operations or threads on a first and second logical core), and may do so in a variety of ways including time sliced multithreading, simultaneous multithreading (e.g., where a single physical core provides a logical core for each of the threads that physical core is simultaneously multithreading), or a combination thereof (e.g., time sliced fetching and decoding and simultaneous multithreading thereafter). In the depicted embodiment, each single processor core 109(1) to 109(N) includes an instance of branch predictor 120. Branch predictor 120 may include a branch target buffer (BTB) 124.

In certain embodiments, branch target buffer 124 stores (e.g., in a branch predictor array) the predicted target instruction corresponding to each of a plurality of branch instructions (e.g., branch instructions of a section of code that has been executed multiple times). In the depicted embodiment, a branch address calculator (BAC) 142 is included which accesses (e.g., includes) a return stack buffer 144 (RSB). In certain embodiments, return stack buffer 144 is to store (e.g., in a stack data structure of last data in is the first data out (LIFO)) the return addresses of any CALL instructions (e.g., that push their return address on the stack).

Branch address calculator (BAC) 142 is used to calculate addresses for certain types of branch instructions and/or to verify branch predictions made by a branch predictor (e.g., BTB). In certain embodiments, the branch address calculator performs branch target and/or next sequential linear address computations. In certain embodiments, the branch address calculator performs static predictions on branches based on the address calculations.

In certain embodiments, the branch address calculator 142 contains a return stack buffer 144 to keep track of the return addresses of the CALL instructions. In one embodiment, the branch address calculator attempts to correct any improper prediction made by the branch predictor 120 to reduce branch misprediction penalties. As one example, the branch address calculator verifies branch prediction for those branches whose target can be determined solely from the branch instruction and instruction pointer.

In certain embodiments, the branch address calculator 142 maintains the return stack buffer 144 utilized as a branch prediction mechanism for determining the target address of return instructions, e.g., where the return stack buffer operates by monitoring all "call subroutine" and "return from subroutine" branch instructions. In one embodiment, when the branch address calculator detects a "call subroutine" branch instruction, the branch address calculator pushes the address of the next instruction onto the return stack buffer, e.g., with a top of stack pointer marking the top of the return stack buffer. By pushing the address immediately following each "call subroutine" instruction onto the return stack buffer, the return stack buffer contains a stack of return addresses in this embodiment. When the branch address calculator later detects a "return from subroutine" branch instruction, the branch address calculator pops the top return address off of the return stack buffer, e.g., to verify the return address predicted by the branch predictor 120. In one embodiment, for a direct branch type, the branch address calculator is to (e.g., always) predict taken for a conditional branch, for example, and if the branch predictor does not predict taken for the direct branch, the branch address calculator overrides the branch predictor's missed prediction or improper prediction.

The core 109 in FIG. 1 includes circuitry to validate branch predictions made by the branch predictor 120. Each branch predictor 120 entry (e.g., in BTB 124) may further include a valid field and a bundle address (BA) field which are used to increase the accuracy and validate branch predictions performed by the branch predictor 120, as is discussed in more detail below. In one embodiment, the valid field and the BA field each consist of one bit fields. In other embodiments, however, the size of the valid and BA fields may vary. In one embodiment, a fetched instruction is sent (e.g., by BAC 142 from line 137) to the decoder 146 to be decoded, and the decoded instruction is sent to the execution unit 154 to be executed.

Depicted computer system 100 includes a network device 101, input/output (I/O) circuit 103 (e.g., keyboard), display 105, and a system bus (e.g., interconnect) 107.

In one embodiment, the branch instructions stored in the branch predictor 120 are pre-selected by a compiler as branch instructions that will be taken. In certain embodiments, the compiler code 104, as shown stored in the memory 102 of FIG. 1, includes a sequence of code that, when executed, translates source code of a program written in a high-level language into executable machine code. In one embodiment, the compiler code 104 further includes additional branch predictor code 106 that predicts a target instruction for branch instructions (for example, branch instructions that are likely to be taken (e.g., pre-selected branch instructions)). The branch predictor 120 (e.g., BTB 124 thereof) is thereafter updated with target instruction for a branch instruction. In one embodiment, software manages a hardware BTB, e.g., with the software specifying the prediction mode or with the prediction mode defined implicitly by the mode of the instruction that writes the BTB also setting a mode bit in the entry.

As discussed below, depicted core (e.g., branch predictor 120 thereof) includes access to one or more registers. In certain embodiments, core include one or more general purpose register(s) 108.

In certain embodiments, each entry for the branch predictor 120 (e.g., in BTB 124 thereof) includes a tag field and a target field. In one embodiment, the tag field of each entry in the BTB stores at least a portion of an instruction pointer (e.g., memory address) identifying a branch instruction. In one embodiment, the tag field of each entry in the BTB stores an instruction pointer (e.g., memory address) identifying a branch instruction in code. In one embodiment, the target field stores at least a portion of the instruction pointer for the target of the branch instruction identified in the tag field of the same entry. Moreover, in other embodiment, the entries for the branch predictor 120 (e.g., in BTB 124 thereof) includes one or more other fields. In certain embodiments, an entry does not include a separate field to assist in the prediction of whether the branch instruction is taken, e.g., if a branch instruction is present (e.g., in the BTB), it is considered to be taken.

As shown in FIG. 1, the IP Gen mux 113 of IP generation stage 111 receives an instruction pointer from line 114A. The instruction pointer provided via line 115A is generated by the incrementer circuit 115, which receives a copy of the most recent instruction pointer from the path 113A. The incrementer circuit 115 may increment the present instruction pointer by a predetermined amount, to obtain the next sequential instruction from a program sequence presently being executed by the core.

In one embodiment, upon receipt of the IP from IP Gen mux 113, the branch predictor 120 compares a portion of the IP with the tag field of each entry in the branch predictor 120 (e.g., BTB 124). If no match is found between the IP and the tag fields of the branch predictor 120, the IP Gen mux will proceed to select the next sequential IP as the next instruction to be fetched in this embodiment. Conversely, if a match is detected, the branch predictor 120 reads the valid field of the branch predictor entry which matches with the IP. If the valid field is not set (e.g., has logical value of 0) the branch predictor 120 considers the respective entry to be "invalid" and will disregard the match between the IP and the tag of the respective entry in this embodiment, e.g., and the branch target of the respective entry will not be forwarded to the IP Gen Mux. On the other hand, if the valid field of the matching entry is set (e.g., has a logical value of 1), the branch predictor 120 proceeds to perform a logical comparison between a predetermined portion of the instruction pointer (IP) and the branch address (BA) field of the matching branch predictor entry in this embodiment. If an "allowable condition" is present, the branch target of the matching entry will be forwarded to the IP Gen mux, and otherwise, the branch predictor 120 disregards the match between the IP and the tag of the branch predictor entry. In some embodiment, the entry indicator is formed from not only the current branch IP, but also at least a portion of the global history.

More specifically, in one embodiment, the BA field indicates where the respective branch instruction is stored within a line of cache memory 132. In certain embodiments, a processor is able to initiate the execution of multiple instructions per clock cycle, wherein the instructions are not interdependent and do not use the same execution resources.

For example, each line of the instruction cache 132 shown in FIG. 1 includes multiple instructions (e.g., six instructions). Moreover, in response to a fetch operation by the fetch unit 134, the instruction cache 132 responds (e.g., in the case of a "hit") by providing a full line of cache to the fetch unit 134 in this embodiment. The instructions within a line of cache may be grouped as separate "bundles." For example, as shown in FIG. 1, the first three instructions in a cache line 133 may be addressed as bundle 0, and the second three instructions may be address as bundle 1. Each of the instructions within a bundle are independent of each other (e.g., can be simultaneously issued for execution). The BA field provided in the branch predictor 120 entries is used to identify the bundle address of the branch instruction which corresponds to the respective entry in certain embodiments. For example, in one embodiment, the BA identifies whether the branch instruction is stored in the first or second bundle of a particular cache line.

In one embodiment, the branch predictor 120 performs a logical comparison between the BA field of a matching entry and a predetermined portion of the IP to determine if an "allowable condition" is present. For example, in one embodiment, the fifth bit position of the IP (e.g. IP[4]) is compared with the BA field of a matching (e.g., BTB) entry. In one embodiment, an allowable condition is present when IP [4] is not greater than the BA. Such an allowable condition helps prevent the apparent unnecessary prediction of a branch instruction, which may not be executed. That is, when less than all of the IP is considered when doing a comparison against the tags of the branch predictor 120, it is possible to have a match with a tag, which may not be a true match. Nevertheless, a match between the IP and a tag of the branch predictor indicates a particular line of cache, which includes a branch instruction corresponding to the respective branch predictor entry, may about to be executed. Specifically, if the bundle address of the IP is not greater than the BA field of the matching branch predictor entry, then the branch instruction in the respective cache line is soon to be executed. Hence, a performance benefit can be achieved by proceeding to fetch the target of the branch instruction in certain embodiments.

As discussed above, if an "allowable condition" is present, the branch target of the matching entry will be forwarded to the IP Gen mux in this example. Otherwise, the branch predictor will disregard the match between the IP and the tag. In one embodiment, the branch target forwarded from the branch predictor is initially sent to a Branch Prediction (BP) resteer mux 128, before it is sent to the IP Gen mux. The BP resteer mux 128, as shown in FIG. 1, may also receive instruction pointers from other branch prediction devices. In one embodiment, the input lines received by the BP resteer mux will be prioritized to determine which input line will be allowed to pass through the BP resteer mux onto the IP Gen mux.

In addition to forwarding a branch target to the BP resteer mux, upon detecting a match between the IP and a tag of the branch predictor, the BA of the matching branch predictor entry is forwarded to the Branch Address Calculator (BAC) 142. The BAC 142 is shown in FIG. 1 to be located in the decode stage 140, but may be located in other stage(s). The BAC of may also receive a cache line from the fetch unit 134 via line 137.

The IP selected by the IP Gen mux is also forwarded to the fetch unit 134, via data line 135 in this example. Once the IP is received by the fetch unit 134, the cache line corresponding to the IP is fetched from the instruction cache 132. The cache line received from the instruction cache is forwarded to the BAC, via data line 137.

Upon receipt of the BA in this example, the BAC will read the BA to determine where the pre-selected branch instruction (e.g., identified in the matching branch predictor entry) is located in the next cache line to be received by the BAC (e.g., the first or second bundle of the cache line). In one embodiment, it is predetermined where the branch instruction is located within a bundle of a cache line (e.g., in a bundle of three instructions, the branch instruction will be stored as the second instruction).

In alternative embodiments, the BA includes additional bits to more specifically identify the address of the branch instruction within a cache line. Therefore, the branch instruction would not be limited to a specific instruction position within a bundle.

After the BAC determines the address of the pre-selected branch instruction within the cache line, and has received the respective cache line from the fetch unit 134, the BAC will decode the respective instruction to verify the IP truly corresponds to a branch instruction. If the instruction addressed by BA in the received cache line is a branch instruction, no correction for the branch prediction is necessary. Conversely, if the respective instruction in the cache line is not a branch instruction (i.e., the IP does not correspond to a branch instruction), the BAC will send a message to the branch predictor to invalidate the respective branch predictor entry, to prevent similar mispredictions on the same branch predictor entry. Thereafter, the invalidated branch predictor entry will be overwritten by a new branch predictor entry.

In addition, in one embodiment, the BAC will increment the IP by a predetermined amount and forward the incremented IP to the BP resteer mux 128, via data line 145, e.g., the data line 145 coming from the BAC will take priority over the data line from the branch predictor. As a result, the incremented IP will be forwarded to the IP Gen mux and passed to the fetch unit in order to correct the branch misprediction by fetching the instructions that sequentially follow the IP.

In certain embodiments, the context manager circuit 110 allows one or more of the above discussed shared components to be utilized by multiple contexts while alleviating information being leaked across contexts by directly or indirectly observing the information stored. In certain embodiments, a change of context (e.g., context signature as discussed herein) triggers a change of the active physical context of the execution resource (e.g., logical core or logical CPU), for example, and that active physical context is used to (e.g., only) access information for that particular contexts (e.g., and not any of the other contexts).

FIG. 2 illustrates embodiments of context table 200 mapping small number of context signatures to physical contexts. In these embodiments, a context signature 201 comprises at least three types of information: a hardware thread ID 203, a paging register (such as CR3) value 205, and a ring level 207 (such as kernel or user-level). Each context signature 201 is associated with a physical context 209.

When one of the fields that comprise the context signature 101 is changed by software (for example, the ring level changes), the context table is consulted for a match on the new signature (e.g., on detection of the context signature change by hardware). If it is found, the physical context associated becomes the active context for that logical CPU. If it is not found, a physical context is allocated either from an unmapped one or from one currently assigned to another context selected via a replacement policy (such as Least Recently Used). In certain embodiments, in the event a context is reclaimed, any structure using that context must invalidate all associated entries such that no information is leaked to the new context. In certain embodiments, in the event a context is reclaimed, any structure using that context must ensure that future usages of that context do not use any entries associated with previous usages of the context (e.g. by invalidating all associated entries or scrambling the entries instead of invalidating them) such that no information is leaked to the current context and no previously associated entries control the current context.

In some embodiments, a (e.g., random) expiring token is associated with a context. For example, when the token expires the context is freed.

In some embodiments, an active field 213 is added to the context mapping structure which identifies which context is currently active, e.g., where it is "one hot" such that only one context is currently active for each CPU (e.g., for each logical processor). In some embodiments, an indication of a footprint 211 for a context is stored in the context table mapping. Footprint 211 may be an indication of how much state related to the associated context is stored in structure(s) so as to aid in replacement decisions. In one embodiment, the footprint value indicates a measure of temporal locality (e.g., true or pseudo least recently used (LRU) replacement policy) and/or an estimated count of the number of entries consumed by a context.

In some embodiments, when there is a context switch, the context signature is stored along with the context information. A context restore would bring the signature and context information back.

The active physical context is used to achieve context isolation in the many prediction and caching structures in a modern CPU. Note that multiple context tables could be created within a single CPU, with each physical context space used for a different subset of prediction and caching structures.

In some embodiments, software is given further control of the context remapping mechanism through ISA extension. For example, a predictor fence instruction may, when decoded by a decoder and executed by an execution unit, serve as a marker to switch the active context (e.g., even if none of the signature components have changed). Further, an argument to the predictor fence instruction may be used as a component of the signature, e.g., allowing software to transition between contexts.

Modern CPUs contain many shared structures dealing with state including, for example, prediction structures, caching structures, a physical register file (renamed state), and buffered state (a store buffer). Prediction structures, such as branch predictors or prefetchers, store state about past execution behavior that is used to predict future behavior. A CPU uses these predictions to guide speculation execution, achieving performance that would not be possible otherwise. Caching structures, such as caches or TLBs, keep local copies of shared state so as to make accesses by the CPU very fast.

Shared structures are a security risk. Information can be leaked across contexts by directly or indirectly observing the information stored. Further, behavior in a victim context can be influenced by training from within an attacking context. Context isolation detailed herein alleviate some of these problems in certain embodiments.

In certain embodiments, a context manager circuit (e.g., a context isolation circuit thereof) isolates contexts by using strict partitioning, competitive sharing (e.g., context tagging), value encryption, or index/tag hashing.

In some embodiments, strict partitioning (replication, set-partitioning, or way-partitioning) is utilized. A way to achieve context isolation is to simply replicate or subdivide the relevant structure. The active physical context is used to select which structure or substructure to access.

This provides a simple and complete isolation. Since contexts do not share any state or storage space, no vulnerability should exist between contexts. Partitioned structures can be dynamically reconfigured based on the number of context signatures in use.

In some embodiments, competitive sharing (context tagging) is utilized. This achieves context isolation by using the physical context to "tag" entries within a shared structure. Since entries written cannot be used when another context is active, this approach prevents influence over a victim context. As the storage space is still shared, some information may be leaked by observing which entries are displaced by the victim context. For example, if a subset of address bits is used to index a structure, it may be possible to probe which set was displaced by a victim context to infer the values of those bits.

This may provide significant isolation with additional storage efficiency from fine-grained sharing. True sharing of entries is easily possible, in case it is needed, since the structure is accessed in the same way with a different tag.

In some embodiments, a value encryption approach is used. This achieves context isolation by making the prediction or cached value have a different meaning between different contexts. A unique (e.g., cryptographically-significant) key is maintained per context. The active context's key is combined with the storage value in each structure to derive its true meaning. This approach may make sense when tagging or context-based invalidation would be prohibitively expensive.

This may achieve context isolation without need for tagging in the structure (saving bits/comparators). Invalidations of context storage do not require hardware support (such as resettable valid bits)—invalidations can be achieved simply by changing the key.

In some embodiments, index/tag encryption (e.g., including hashing) is used. This achieves context isolation by obfuscating the indexing function, possibly in conjunction with the tagging scheme. A unique (e.g., cryptographically-significant) key is maintained per context in one embodiment. The active context's key is combined (such as index encryption via a logic operation) with the structure's conventional index value to compute the true index value. Entry sharing may or may not be possible, depending if further tagging is used as well. While an attacker may observe displaced entries, it would not be practical to reverse engineer the encryption function and key in order to mount an attack based upon them. This approach makes sense when encryption of the data value would be expensive (e.g. 64B cache lines) or the latency is harder to tolerate.

Figure 3:
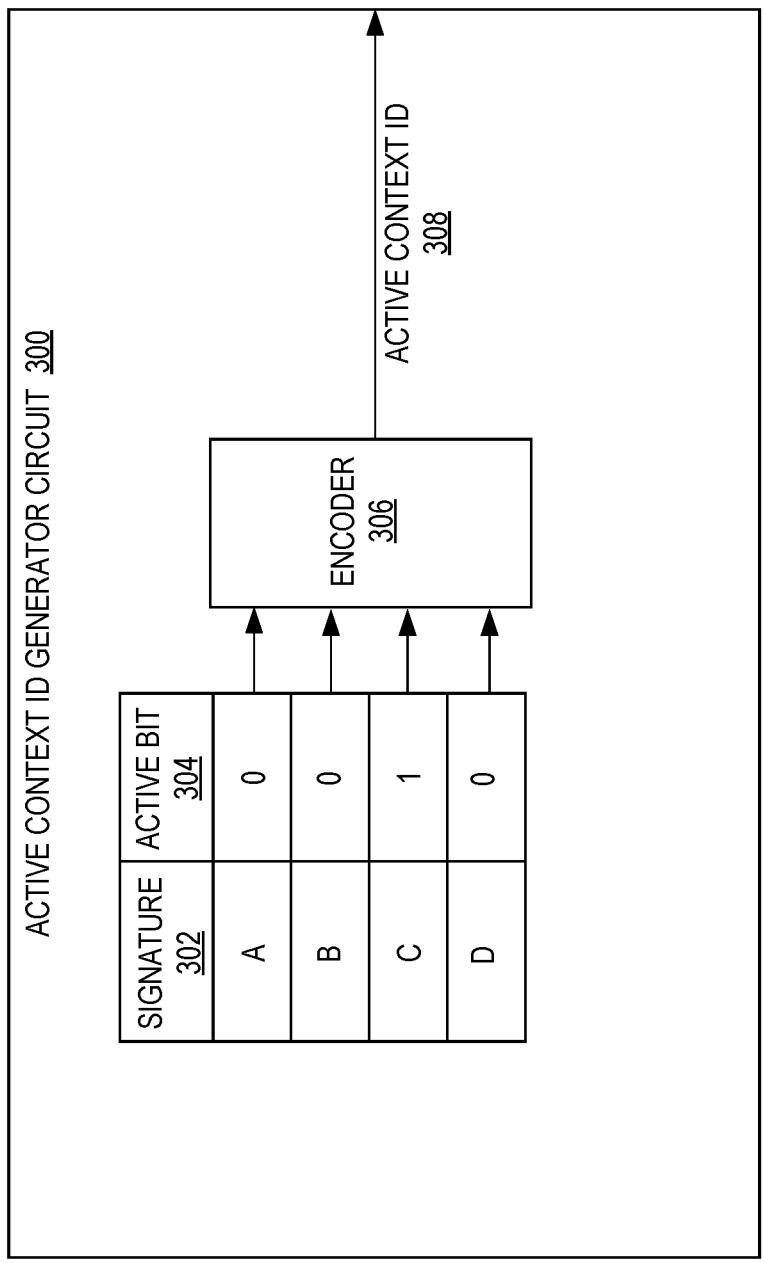
FIG. 3 illustrates an active context identification (ID) generator circuit according to embodiments of the disclosure.

FIG. 3 illustrates an active context identification (ID) generator circuit 300 according to embodiments of the disclosure. In the depicted embodiment, active context ID generator circuit 300 receives as input an indicator for a particular entry from the context signature storage 302 (e.g., corresponding to the context signature as determined from a context table (e.g., context table 200 in FIG. 2) and an indication of the currently active (e.g., executing) (e.g., physical) context from active indicator storage 304. In one embodiment, only a single bit may be set as "hot" (e.g., one-hot active vector) at a time (e.g., for a physical execution resource). Encoder 306 is to generate a (e.g., unique) value (e.g., two-bits wide) of active context ID, for example, as used by the circuitry discussed below.

Figure 4:
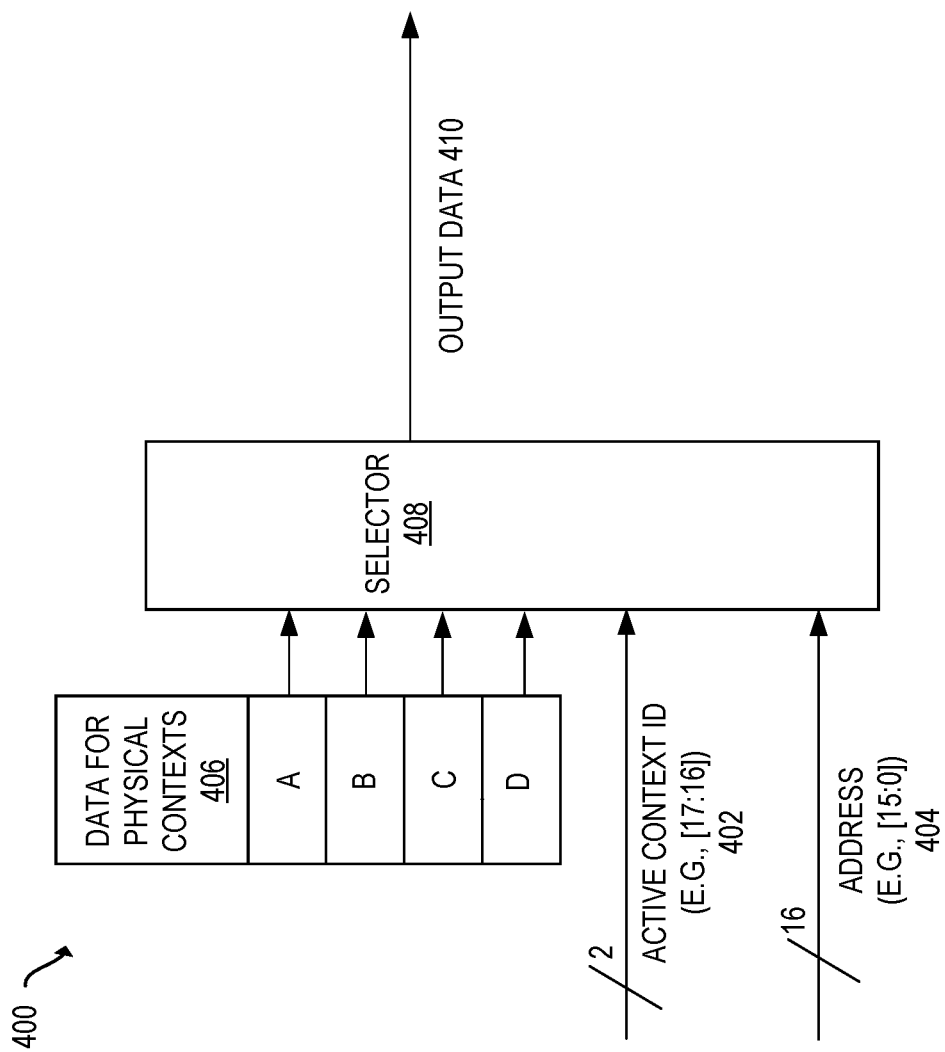
FIG. 4 illustrates a context isolation circuit including an untagged structure using strict partitioning according to embodiments of the disclosure.

FIG. 4 illustrates a context isolation circuit 400 including an untagged structure 406 using strict partitioning according to embodiments of the disclosure. In certain embodiments, context remapping is implemented on the untagged structure 406 (e.g., BTB, RSB, etc.) as a shared resource. In the depicted embodiment, the address of the item that is being accessed (e.g., 16 bits) and the active context ID 402 (e.g., 2 bits) are combined (e.g., concatenated) and used as an index into the data for each of the physical contexts and the output data 410 for that particular context is provided by selector (e.g., selector circuit) 408. In one embodiment, each context takes up multiple entries in the untagged structure 406.

Figure 5:
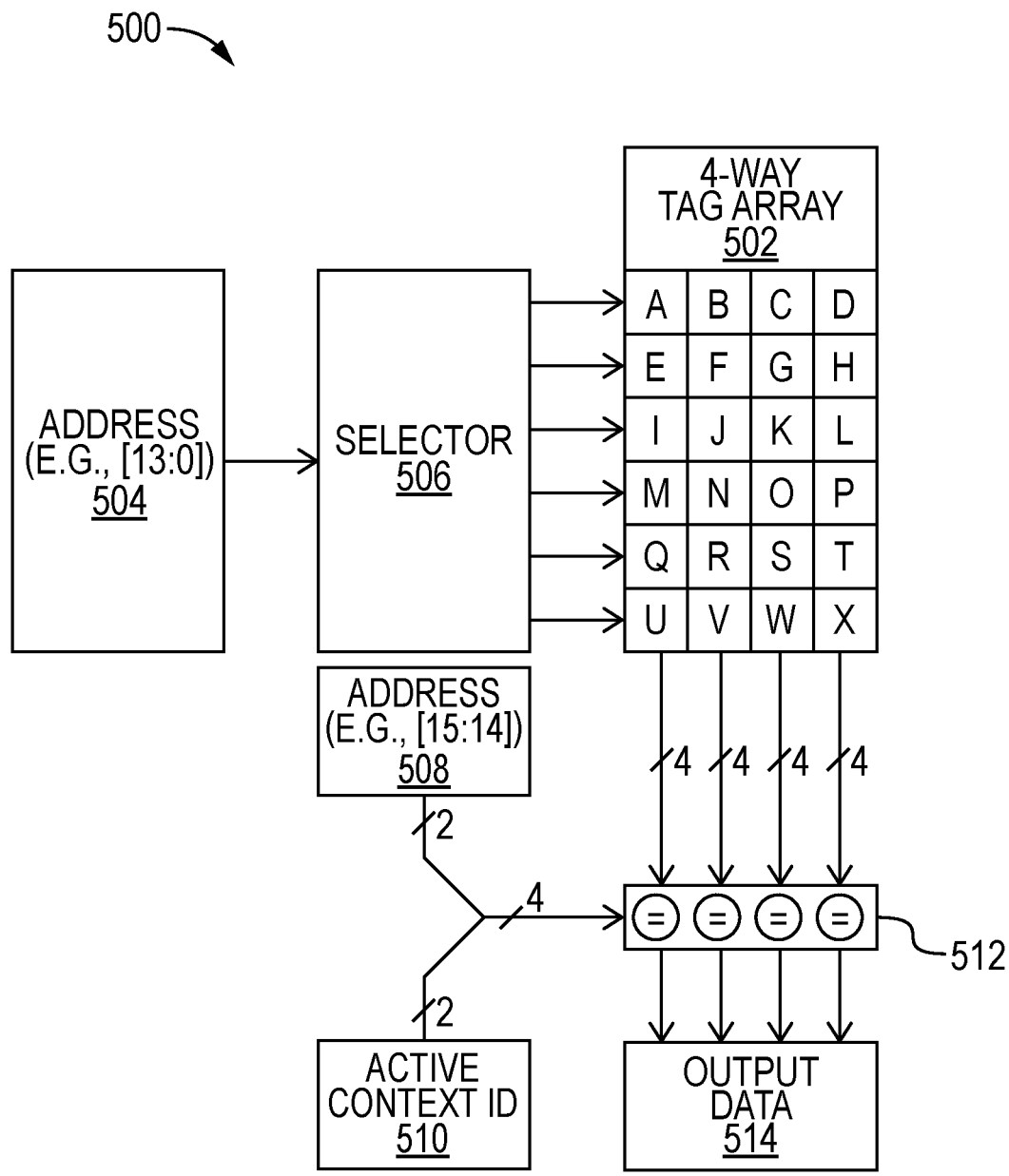
FIG. 5 illustrates a context isolation circuit including a four-way associative tag array implementing competitive sharing according to embodiments of the disclosure.

FIG. 5 illustrates a context isolation circuit 500 including a four-way associative tag array 502 implementing competitive sharing according to embodiments of the disclosure. In certain embodiments, context remapping is implemented on the four-way associative tag array 502 (e.g., BTB, RSB, etc.) as a shared resource. In the depicted embodiment, a proper subset of the address 504 of the item that is being accessed (e.g., bits [13:0] of the 16 bits) is used to select the set (e.g., elements I, J, K, and L) containing the data item to be accessed by selector (e.g., selector circuit) 506. In the depicted embodiment, another proper subset of (e.g., the rest of) the address of the item that is being accessed (e.g., bits [15:14] of the 16 bits) and the active context ID 510 (e.g., 2 bits) are combined (e.g., concatenated) and used to compare against the tag (e.g., element) (e.g., such that the entry will be used only if its context ID matches the active context ID) by selector (e.g., selector circuit) 512 to produce the output data 514. In one embodiment, a context is stored in any of the ways.

Figure 6:
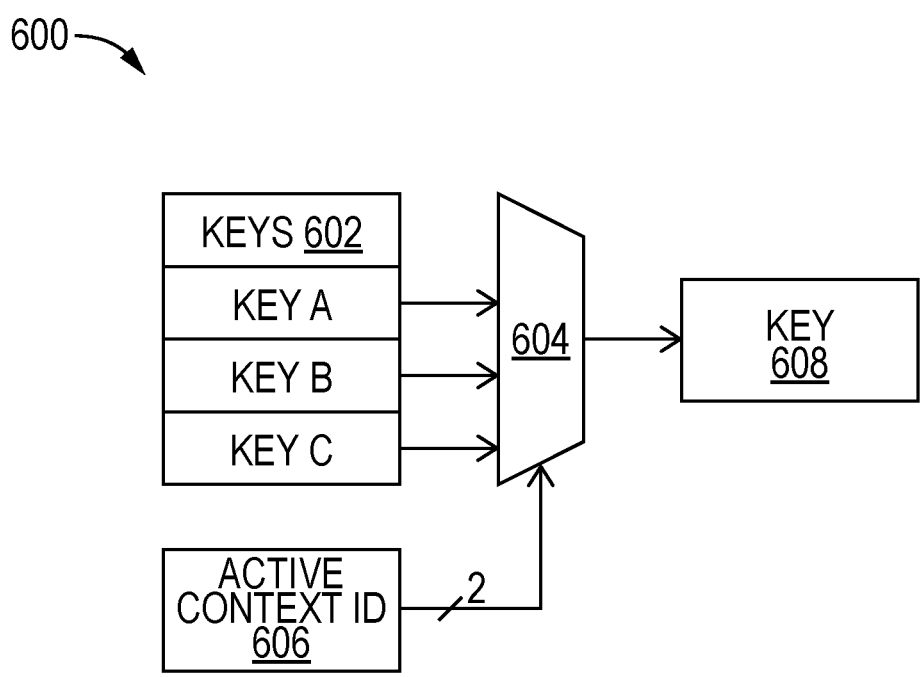
FIG. 6 illustrates a circuit for generating a key for each context ID selected by the active context ID according to embodiments of the disclosure.

FIG. 6 illustrates a circuit 600 for generating a key for each context ID selected by the active context ID according to embodiments of the disclosure. In the depicted circuit 600, a plurality of keys are stored in key storage 602 (e.g., one for each context), and indexed by an active context ID. In one embodiment, a (e.g., new) context ID is sent to selector (e.g., selector circuit) 604, which causes the corresponding key 608 to be output from key storage 602. This key may be used in context remapping as discussed in reference to FIGS. 7 and 8.

Figure 7:
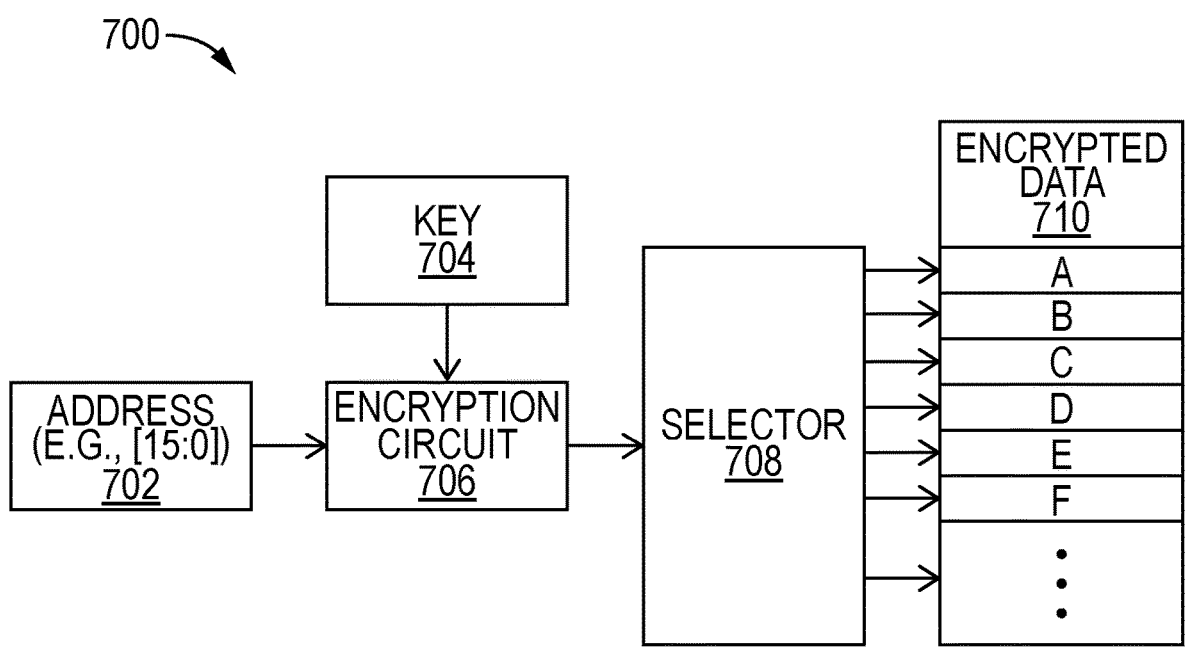
FIG. 7 illustrates a circuit for implementing index encryption of an untagged structure according to embodiments of the disclosure.

FIG. 7 illustrates a circuit 700 for implementing index encryption of an untagged structure 710 according to embodiments of the disclosure. In the depicted embodiment, the (i) address 702 (e.g., 16 bits) of the item (e.g., data that goes in a BTB, RSB, etc.) that is to-be-encrypted (and stored according to context remapping) and (ii) key 704 for that encryption is received by encryption circuit 706 and stored into untagged structure 710 at an element that is also indicated by the address 702.

Figure 8:
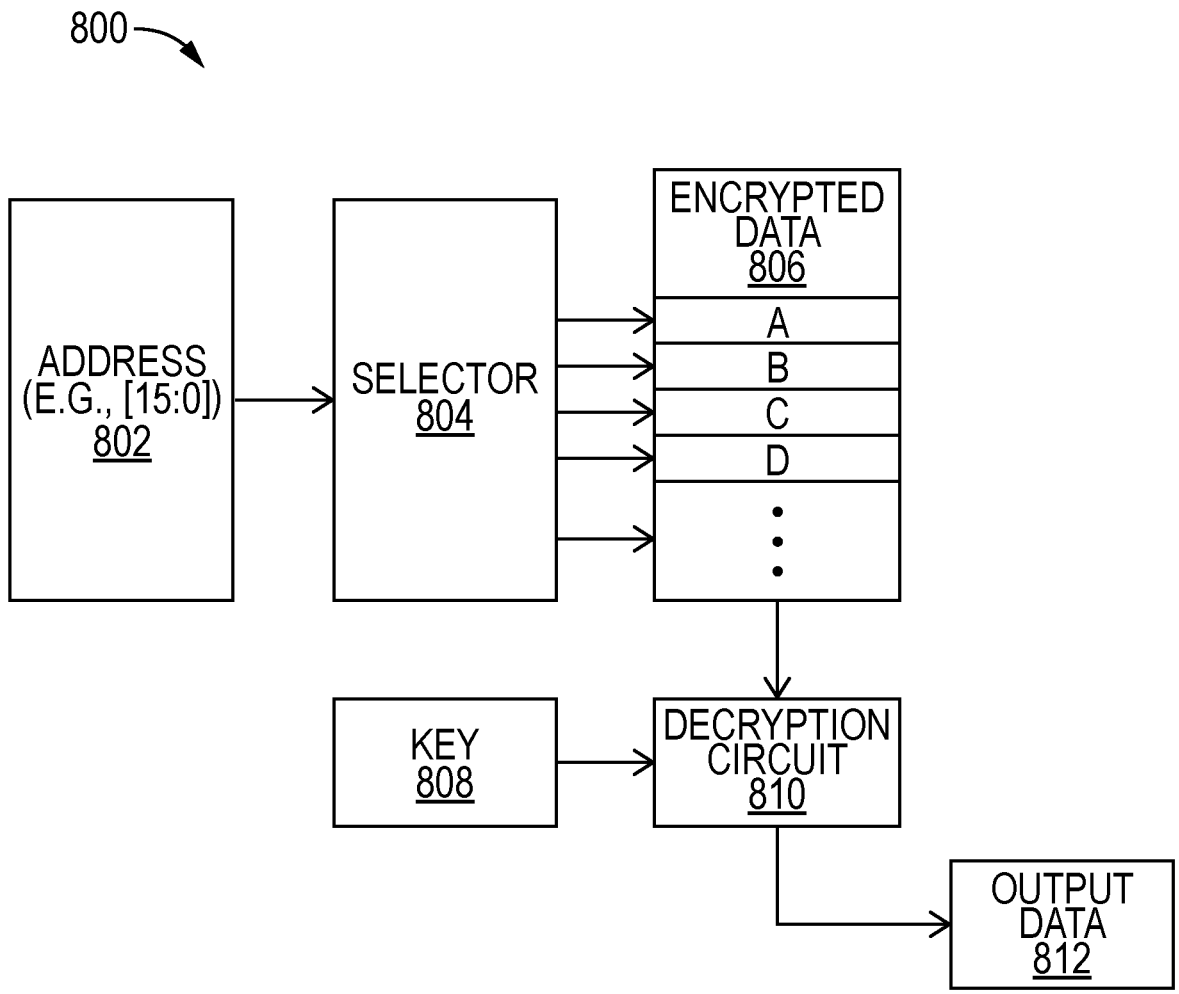
FIG. 8 illustrates a context isolation circuit including an untagged structure with encrypted values being decrypted by a stored key associated with a context ID.

FIG. 8 illustrates a context isolation circuit 800 including an untagged structure 806 with encrypted values being decrypted by a stored key associated with a context ID. In one embodiment, untagged structure 802 is populated according to the embodiments discussed in reference to FIG. 7. In the depicted embodiment, the address 702 (e.g., 16 bits) of the item that is to be accessed according to context remapping is sent to selector 804, and the encrypted data for that address is retrieved from untagged structure 806 and sent to decryption circuit 810. Key 808 (e.g., as generated according to the embodiments discussed in reference to FIG. 6) is used by decryption circuit 810 to decrypt the encrypted data item, and the unencrypted data item is output as output data 812.

Figure 9:
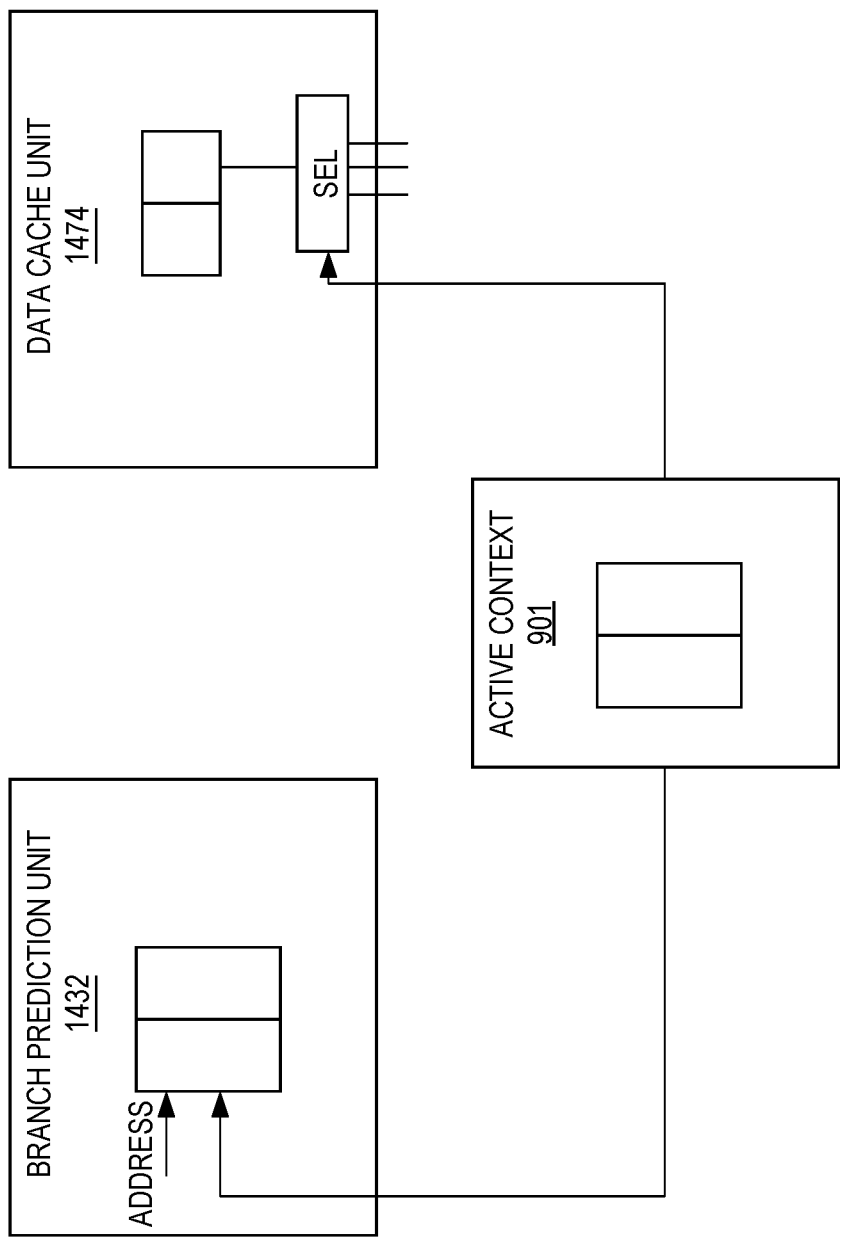
FIG. 9 illustrates an embodiment of usage of active contexts in selection.

FIG. 9 illustrates an embodiment of usage of active contexts in selection. In some embodiments, strict partitioning (replication, set-partitioning, or way-partitioning) is utilized. A way to achieve context isolation is to simply replicate or subdivide the relevant structure. The active physical context is used to select which structure or substructure to access. This is shown in FIG. 9 wherein an active context 901 is used to select a substructure of a BPU 1432 or DACU 1474 in FIG. 14B.

Figure 10:
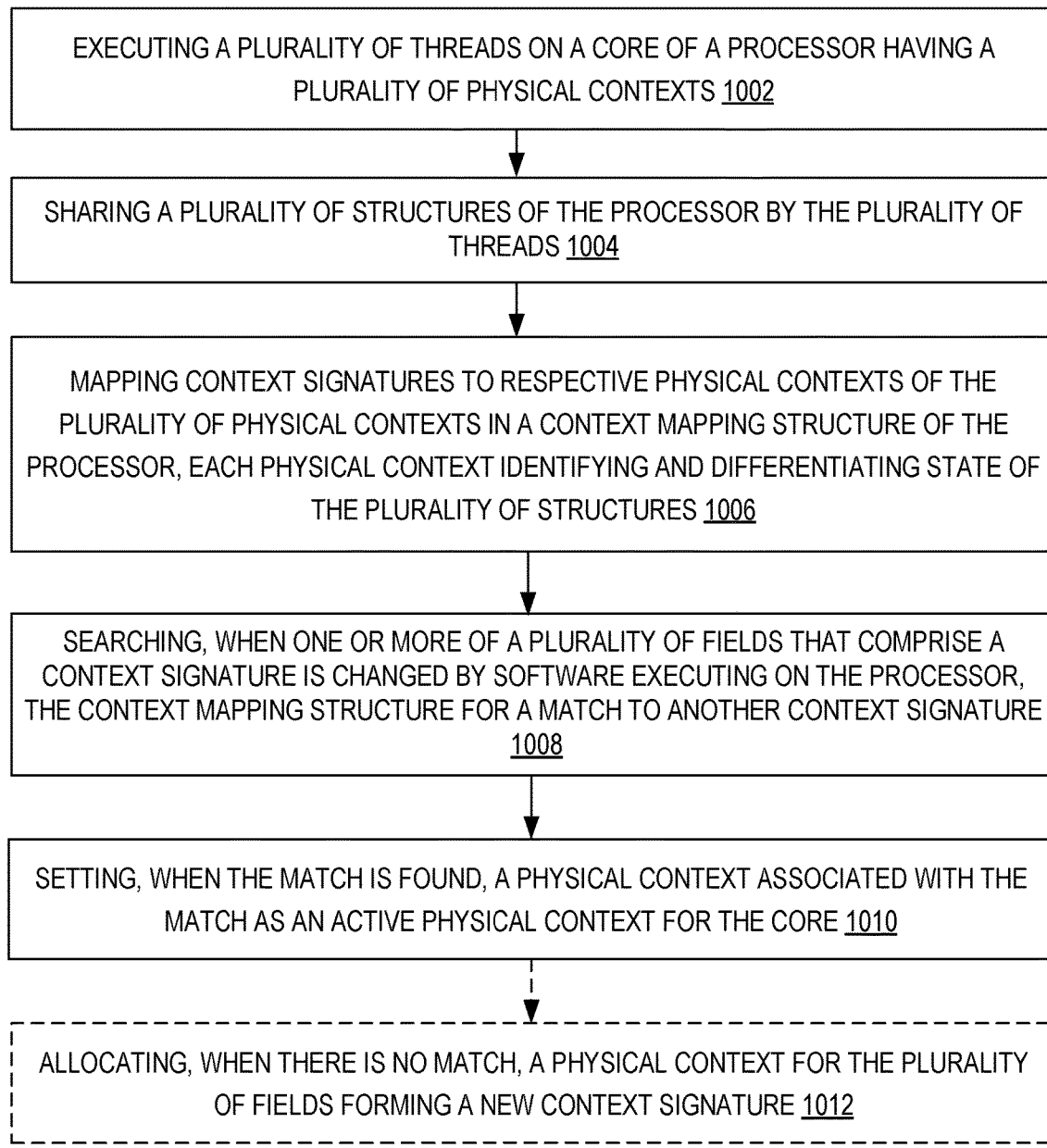
FIG. 10 illustrates a flow diagram according to embodiments of the disclosure.

FIG. 10 illustrates a flow diagram 1000 according to embodiments of the disclosure. Depicted flow 1000 includes executing a plurality of threads on a core of a processor having a plurality of physical contexts 1002, sharing a plurality of structures of the processor by the plurality of threads 1004, mapping context signatures to respective physical contexts of the plurality of physical contexts in a context mapping structure of the processor, each physical context identifying and differentiating state of the plurality of structures 1006, searching, when one or more of a plurality of fields that comprise a context signature is changed by software executing on the processor, the context mapping structure for a match to another context signature 1008, and setting, when the match is found, a physical context associated with the match as an active physical context for the core 1010. Flow 1000 optionally includes allocating, when there is no match, a physical context for the plurality of fields forming a new context signature 1012.

Exemplary architectures, systems, etc. that the above may be used in are detailed below.

At least some embodiments of the disclosed technologies can be described in view of the following examples:

Example 1. A processor comprising:
  a core having a plurality of physical contexts to execute a plurality of (e.g., software) threads;
  a plurality of structures shared by the plurality of threads;
  a context mapping structure to map context signatures to respective physical contexts of the plurality of physical contexts, each physical context to identify and differentiate state of the plurality of structures; and
  a context manager circuit to, when one or more of a plurality of fields that comprise a context signature is changed, search the context mapping structure for a match to another context signature, and when the match is found, a physical context associated with the match is set as an active physical context for the core.

Example 2. The processor of example 1, wherein, when there is no match, the context manager circuit is to allocate a physical context for the plurality of fields forming a new context signature.

Example 3. The processor of example 1, wherein the plurality of structures comprises a prediction structure, a caching structure, a renaming structure, and a buffering structure between components in a pipeline of the core.

Example 4. The processor of example 1, wherein the processor comprises a decoder to decode a single instruction into a decoded single instruction, and an execution unit to execute the decoded single instruction to cause the context manager circuit to switch the active physical context when none of the plurality of fields that comprise the context signature are changed.

Example 5. The processor of example 1, wherein the context mapping structure is saved when a first power command (e.g., command to enter a deep sleep state, such as, but not limited to entering state C6 or C7) is received by the context manager circuit and restored when a second power command (e.g., command to exit a deep sleep state, such as, but not limited to entering an active state (e.g., state C0)) is received by the context manager circuit.

Example 6. The processor of example 1, wherein the context manager circuit comprises an active context identification generator circuit to generate an active context identification value from the context signature and an active bit.

Example 7. The processor of example 6, wherein the context manager circuit uses the active context identification value as an index into a table storing the plurality of physical contexts.

Example 8. The processor of example 6, wherein the context manager circuit uses the active context identification value as an index into a table storing encrypted keys for the plurality of physical contexts.

Example 9. A method comprising:
executing a plurality of threads on a core of a processor having a plurality of physical contexts;
sharing a plurality of structures of the processor by the plurality of threads;
mapping context signatures to respective physical contexts of the plurality of physical contexts in a context mapping structure of the processor, each physical context identifying and differentiating state of the plurality of structures;
searching, when one or more of a plurality of fields that comprise a context signature is changed by software executing on the processor, the context mapping structure for a match to another context signature; and
setting, when the match is found, a physical context associated with the match as an active physical context for the core.

Example 10. The method of example 9, wherein, when there is no match, allocating a physical context for the plurality of fields forming a new context signature.

Example 11. The method of example 9, wherein the plurality of structures comprises a prediction structure, a caching structure, a renaming structure, and a buffering structure between components in a pipeline of the core.

Example 12. The method of example 9, further comprising:
decoding a single instruction into a decoded single instruction with a decoder of the processor; and
executing the decoded single instruction with an execution unit of the processor to switch the active physical context when none of the plurality of fields that comprise the context signature are changed.

Example 13. The method of example 9, further comprising saving the context mapping structure when a first power command is received and restoring the context mapping structure when a second power command is received.

Example 14. The method of example 9, further comprising generating an active context identification value from the context signature and an active bit.

Example 15. The method of example 14, further comprising using the active context identification value as an index into a table storing the plurality of physical contexts.

Example 16. The method of example 14, further comprising using the active context identification value as an index into a table storing encrypted keys for the plurality of physical contexts.

Example 17. A non-transitory machine readable medium that stores code that when executed by
a machine causes the machine to perform a method comprising:
executing a plurality of threads on a core of a processor having a plurality of physical contexts; sharing a plurality of structures of the processor by the plurality of threads;
mapping context signatures to respective physical contexts of the plurality of physical contexts in a context mapping structure of the processor, each physical context identifying and differentiating state of the plurality of structures;
searching, when one or more of a plurality of fields that comprise a context signature is changed by software executing on the processor, the context mapping structure for a match to another context signature; and setting, when the match is found, a physical context associated with the match as an active physical context for the core.

Example 18. The non-transitory machine readable medium of example 17, wherein, when there is no match, allocating a physical context for the plurality of fields forming a new context signature.

Example 19. The non-transitory machine readable medium of example 17, wherein the plurality of structures comprises a prediction structure, a caching structure, a renaming structure, and a buffering structure between components in a pipeline of the core.

Example 20. The non-transitory machine readable medium of example 17, further comprising:

decoding a single instruction into a decoded single instruction with a decoder of the processor; and executing the decoded single instruction with an execution unit of the processor to switch the active physical context when none of the plurality of fields that comprise the context signature are changed.

Example 21. The non-transitory machine readable medium of example 17, further comprising saving the context mapping structure when a first power command is received and restoring the context mapping structure when a second power command is received.

Example 22. The non-transitory machine readable medium of example 17, further comprising generating an active context identification value from the context signature and an active bit.

Example 23. The non-transitory machine readable medium of example 22, further comprising using the active context identification value as an index into a table storing the plurality of physical contexts.

Example 24. The non-transitory machine readable medium of example 22, further comprising using the active context identification value as an index into a table storing encrypted keys for the plurality of physical contexts.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
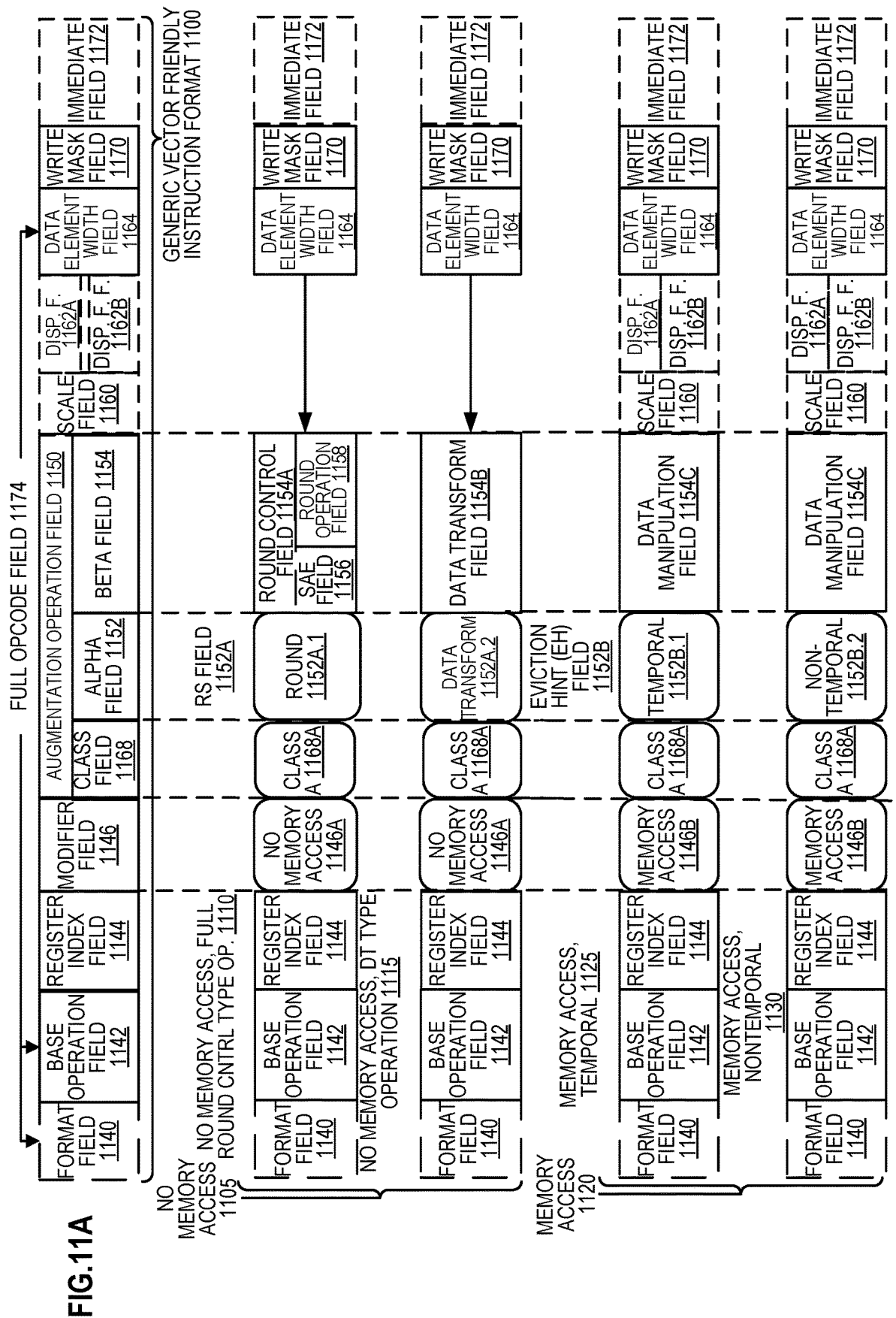
FIG. 11A is a block diagram illustrating a generic vector friendly instruction format and class A instruction templates thereof according to embodiments of the disclosure.
Figure 11B:
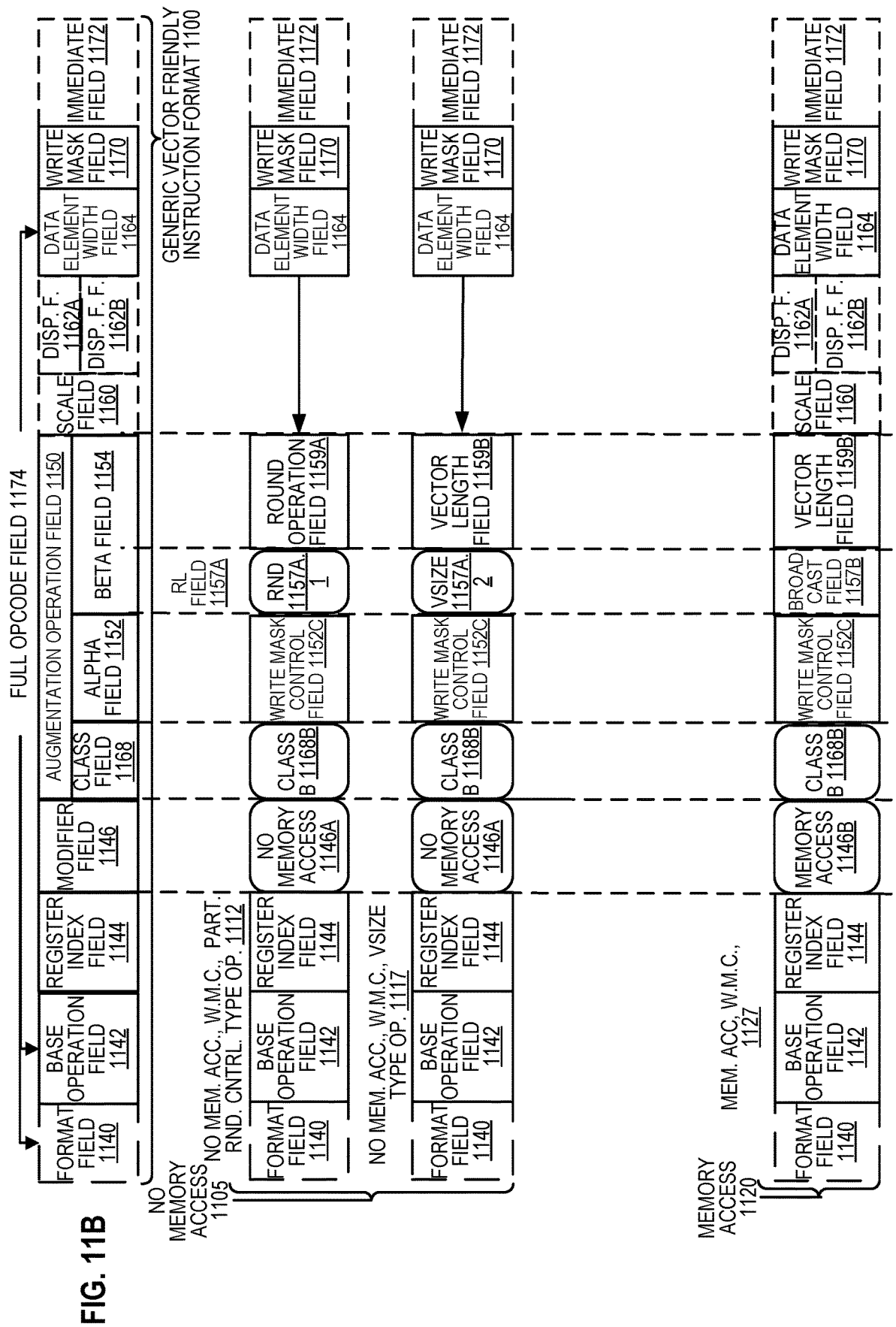
FIG. 11B is a block diagram illustrating the generic vector friendly instruction format and class B instruction templates thereof according to embodiments of the disclosure.

FIGS. 11A-11B are block diagrams illustrating a generic vector friendly instruction format and instruction templates thereof according to embodiments of the disclosure. FIG. 11A is a block diagram illustrating a generic vector friendly instruction format and class A instruction templates thereof according to embodiments of the disclosure; while FIG. 11B is a block diagram illustrating the generic vector friendly instruction format and class B instruction templates thereof according to embodiments of the disclosure. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the disclosure, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*\text{index}+\text{base}$).

Displacement Field 1162A—its content is used as part of memory address generation (e.g., for address generation that uses $2^{scale}*\text{index}+\text{base}+\text{displacement}$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the disclosure are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that it is not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the disclosure the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the disclosure where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the disclosure where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the disclosure. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the disclosure are described with reference to the specific vector friendly instruction format 1200 in the context of the generic vector friendly instruction format 1100 for illustrative purposes, the disclosure is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the disclosure is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0×62 (the unique value used for distinguishing the vector friendly instruction format in one embodiment of the disclosure).

The second-fourth bytes (EVEX Bytes 1-3) include a number of bit fields providing specific capability.

REX field 1205 (EVEX Byte 1, bits [7-5])—consists of an EVEX.R bit field (EVEX Byte 1, bit [7]—R), EVEX.X bit field (EVEX byte 1, bit [6]—X), and 1157BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (0F, 0F 38, or 0F 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1 s complement) form. Depending on the instruction, an extra different EVEX bit field is used to extend the specifier size to 32 registers.

EVEX.U 1168 Class field (EVEX byte 2, bit [2]—U)—If EVEX.U=0, it indicates class A or EVEX.U0; if EVEX.U=1, it indicates class B or EVEX.U1.

Prefix encoding field 1225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 12B is a block diagram illustrating the fields of the specific vector friendly instruction format 1200 that make up the full opcode field 1174 according to one embodiment of the disclosure. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the disclosure. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
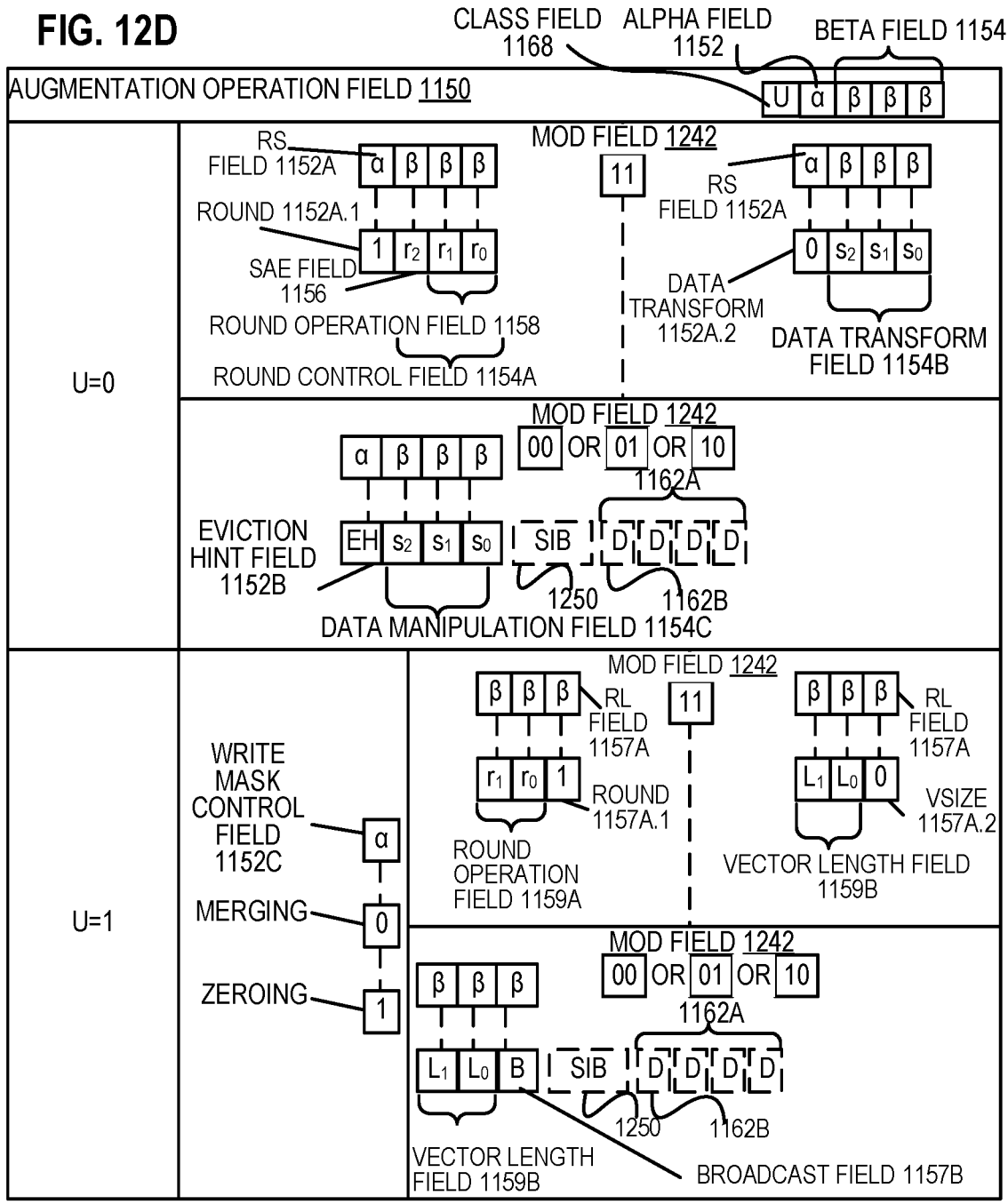
FIG. 12D is a block diagram illustrating the fields of the specific vector friendly instruction format in FIG. 12A that make up the augmentation operation field 1150 according to one embodiment of the disclosure.

FIG. 12D is a block diagram illustrating the fields of the specific vector friendly instruction format 1200 that make up the augmentation operation field 1150 according to one embodiment of the disclosure. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]—EH) is interpreted as the rs field 1152A. When the rs field 1152A contains a 1 (round 1152A.1), the beta field 1154 (EVEX byte 3, bits [6:4]—SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]—SSS) is interpreted as a three bit data transform field 1154B. When U=0 and the MOD field 1242 contains 00, 01, or 10 (signifying a memory access operation), the alpha field 1152 (EVEX byte 3, bit [7]—EH) is interpreted as the eviction hint (EH) field 1152B and the beta field 1154 (EVEX byte 3, bits [6:4]—SSS) is interpreted as a three bit data manipulation field 1154C.

When U=1, the alpha field 1152 (EVEX byte 3, bit [7]—EH) is interpreted as the write mask control (Z) field 1152C. When U=1 and the MOD field 1242 contains 11 (signifying a no memory access operation), part of the beta field 1154 (EVEX byte 3, bit [4]—$S_0$) is interpreted as the RL field 1157A; when it contains a 1 (round 1157A.1) the rest of the beta field 1154 (EVEX byte 3, bit [6-5]—$S_{2-1}$) is interpreted as the round operation field 1159A, while when the RL field 1157A contains a 0 (VSIZE 1157.A2) the rest of the beta field 1154 (EVEX byte 3, bit [6-5]—$S_{2-1}$) is interpreted as the vector length field 1159B (EVEX byte 3, bit [6-5]—$L_{1-0}$). When U=1 and the MOD field 1242 contains 00, 01, or 10 (signifying a memory access operation), the beta field 1154 (EVEX byte 3, bits [6:4]—SSS) is interpreted as the vector length field 1159B (EVEX byte 3, bit [6-5]—$L_{1-0}$) and the broadcast field 1157B (EVEX byte 3, bit [4]—B).

Exemplary Register Architecture

Figure 13:
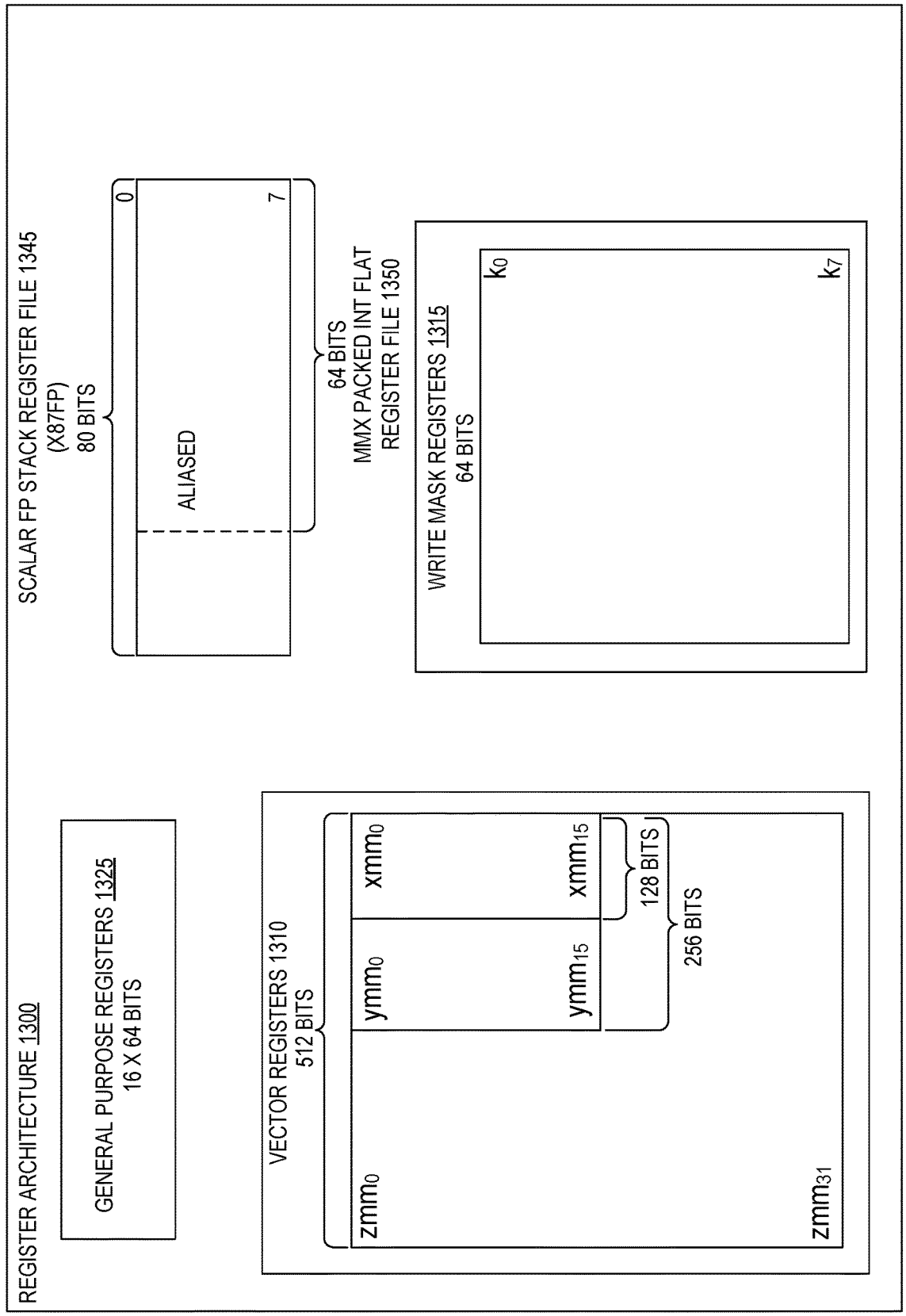
FIG. 13 is a block diagram of a register architecture according to one embodiment of the disclosure

FIG. 13 is a block diagram of a register architecture 1300 according to one embodiment of the disclosure. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
| --- | --- | --- | --- |
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the disclosure. FIG. 14B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macro-instructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 (e.g., execution circuits) and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
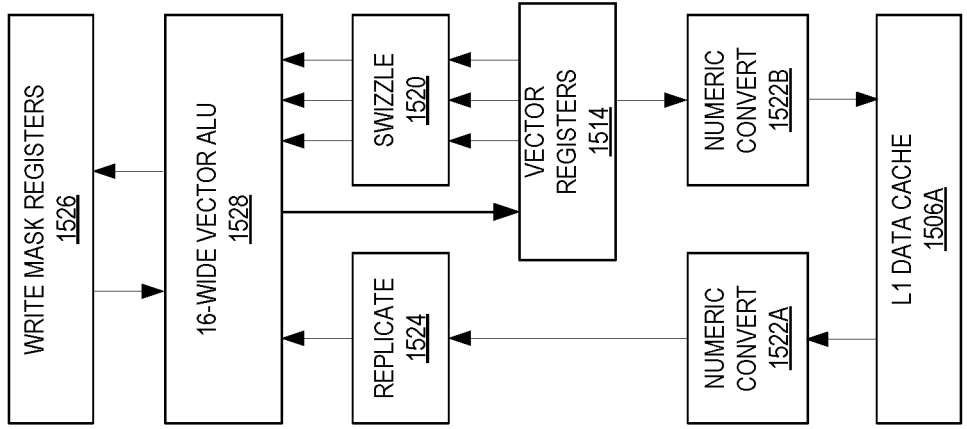
FIG. 15B is an expanded view of part of the processor core in FIG. 15A according to embodiments of the disclosure.
Figure 15A:
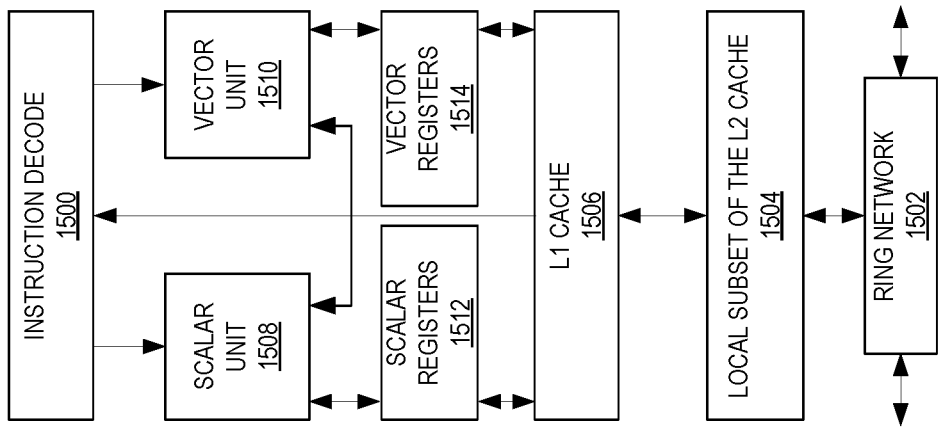
FIG. 15A is a block diagram of a single processor core, along with its connection to the on-die interconnect network and with its local subset of the Level 2 (L2) cache, according to embodiments of the disclosure.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the disclosure. In one embodiment, an instruction decode unit 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the disclosure may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the disclosure. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
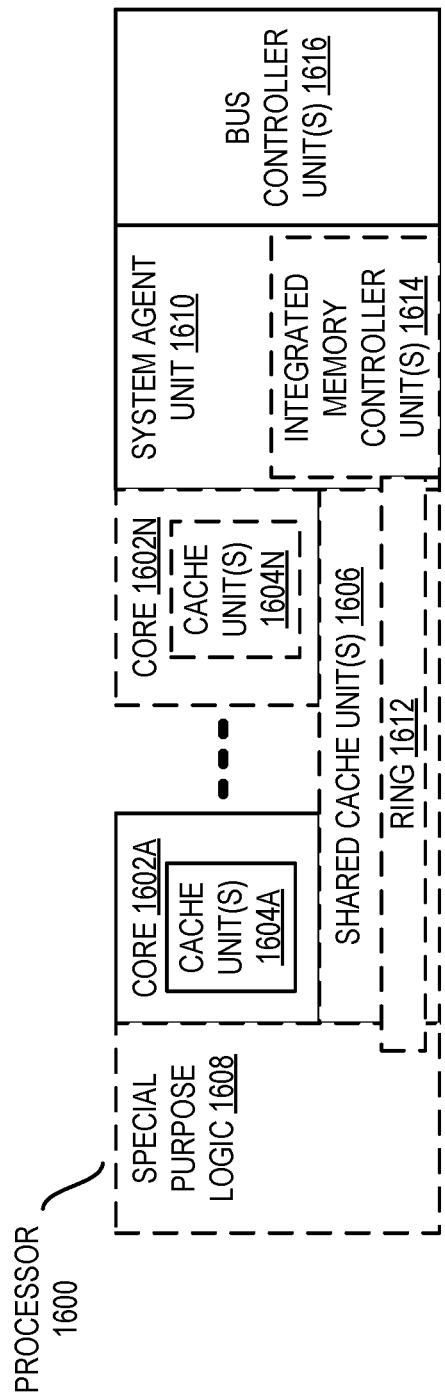
FIG. 16 is a block diagram of a processor that may have more than one core, may have an integrated memory controller, and may have integrated graphics according to embodiments of the disclosure.

FIG. 16 is a block diagram of a processor 1600 that may have more than one core, may have an integrated memory controller, and may have integrated graphics according to embodiments of the disclosure. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
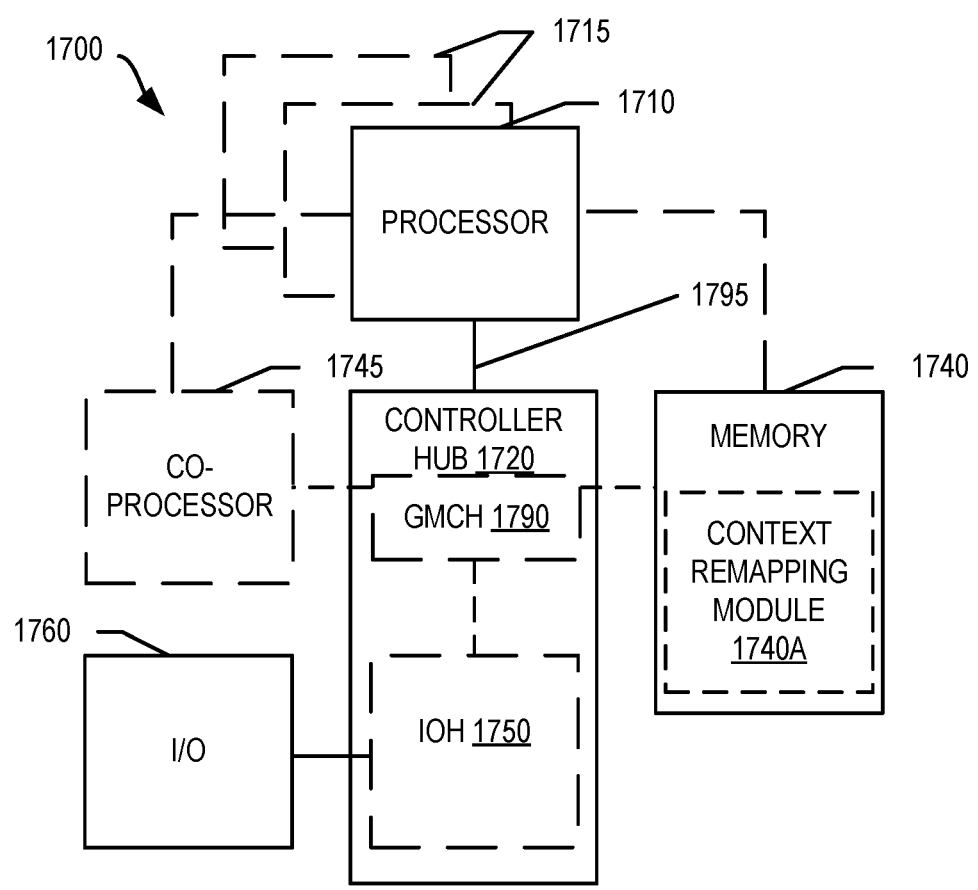
FIG. 17 is a block diagram of a system in accordance with one embodiment of the present disclosure.

Referring now to FIG. 17, shown is a block diagram of a system 1700 in accordance with one embodiment of the present disclosure. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750. Memory 1740 may include a context remapping module 1740A, for example, to store code that when executed causes a processor to perform any method of this disclosure.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as Quickpath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
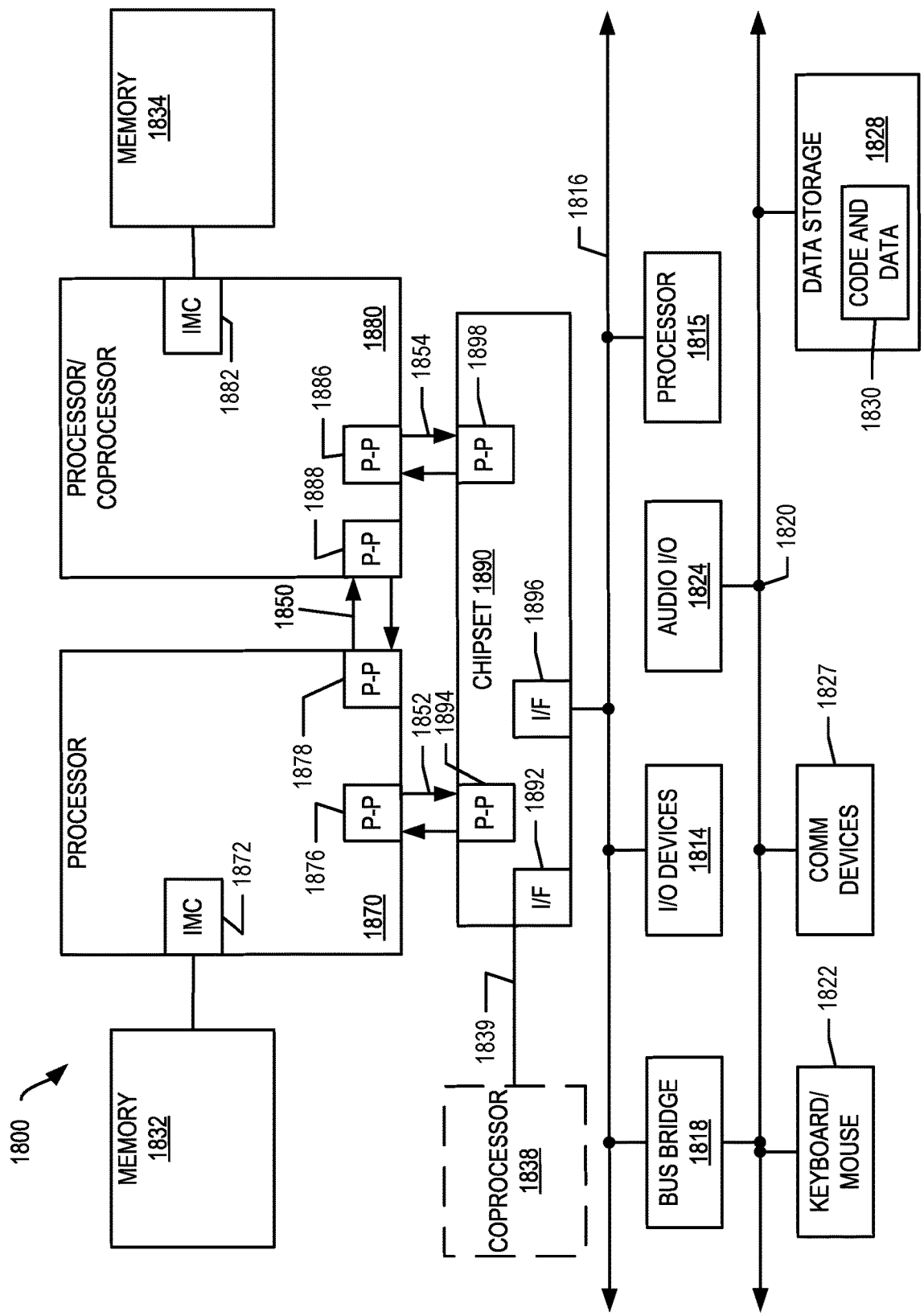
FIG. 18 is a block diagram of a more specific exemplary system in accordance with an embodiment of the present disclosure.

Referring now to FIG. 18, shown is a block diagram of a first more specific exemplary system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the disclosure, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
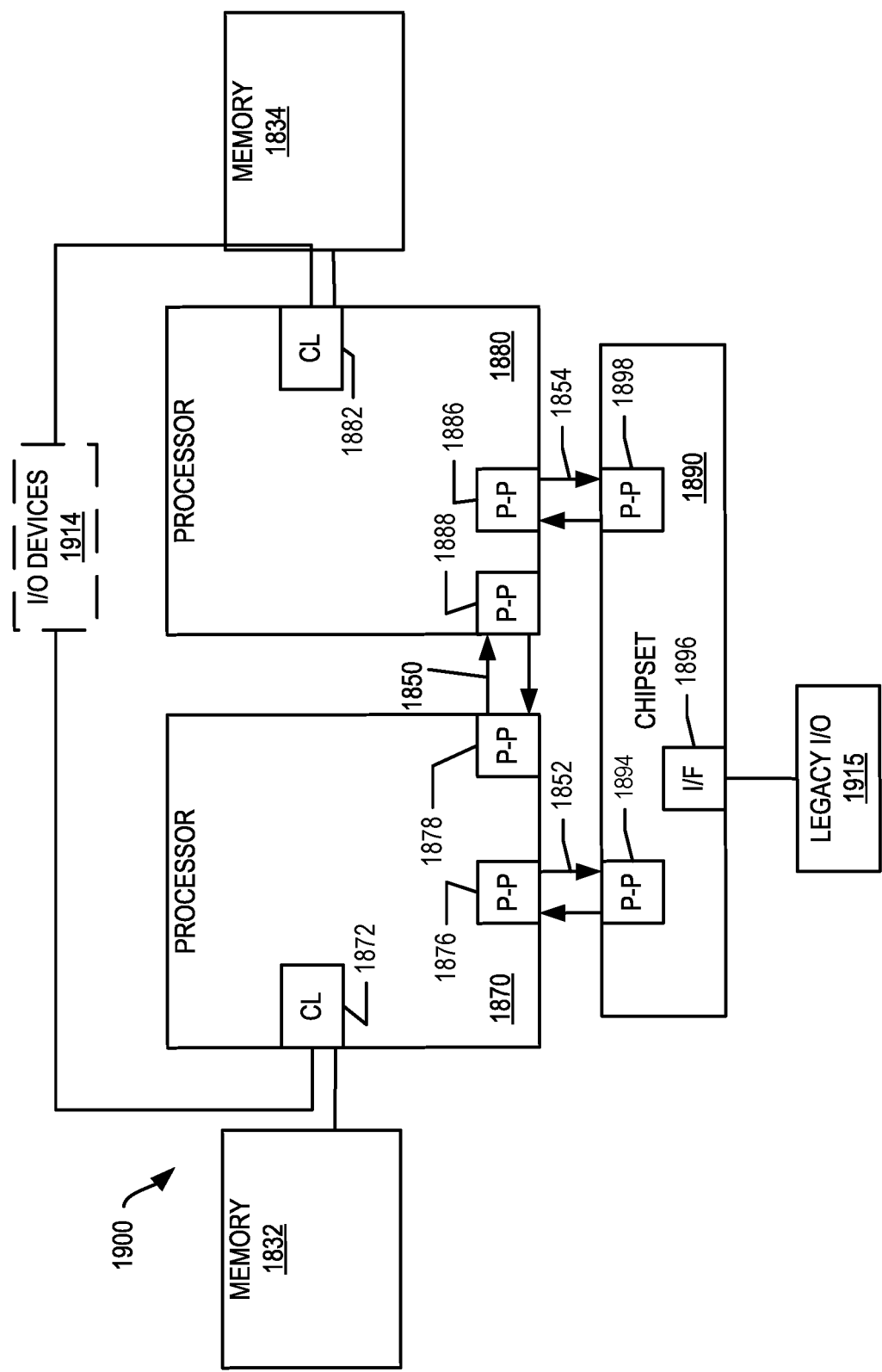
FIG. 19 is a block diagram of a second more specific exemplary system in accordance with an embodiment of the present disclosure.

Referring now to FIG. 19, shown is a block diagram of a second more specific exemplary system 1900 in accordance with an embodiment of the present disclosure. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
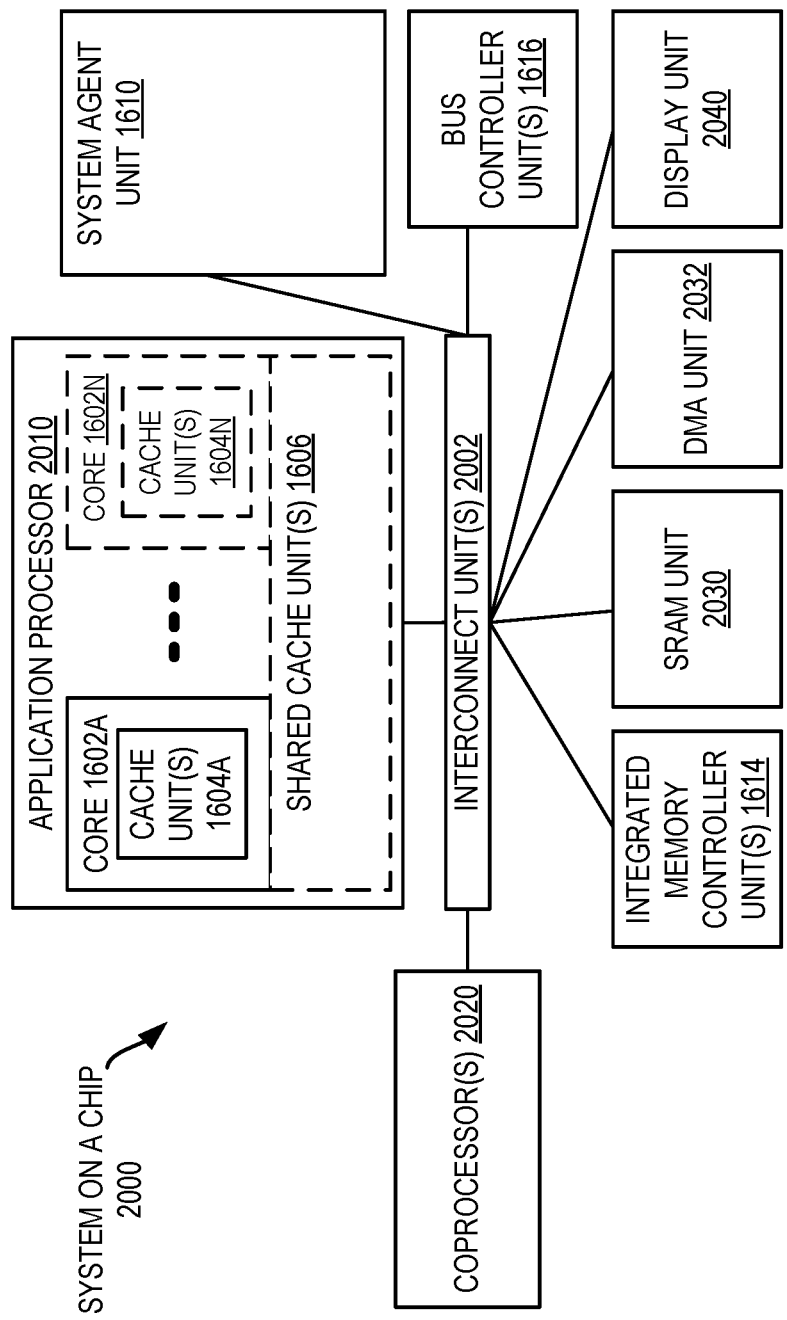
FIG. 20 is a block diagram of a system on a chip (SoC) in accordance with an embodiment of the present disclosure.

Referring now to FIG. 20, shown is a block diagram of a SoC 2000 in accordance with an embodiment of the present disclosure. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 202A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; a static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
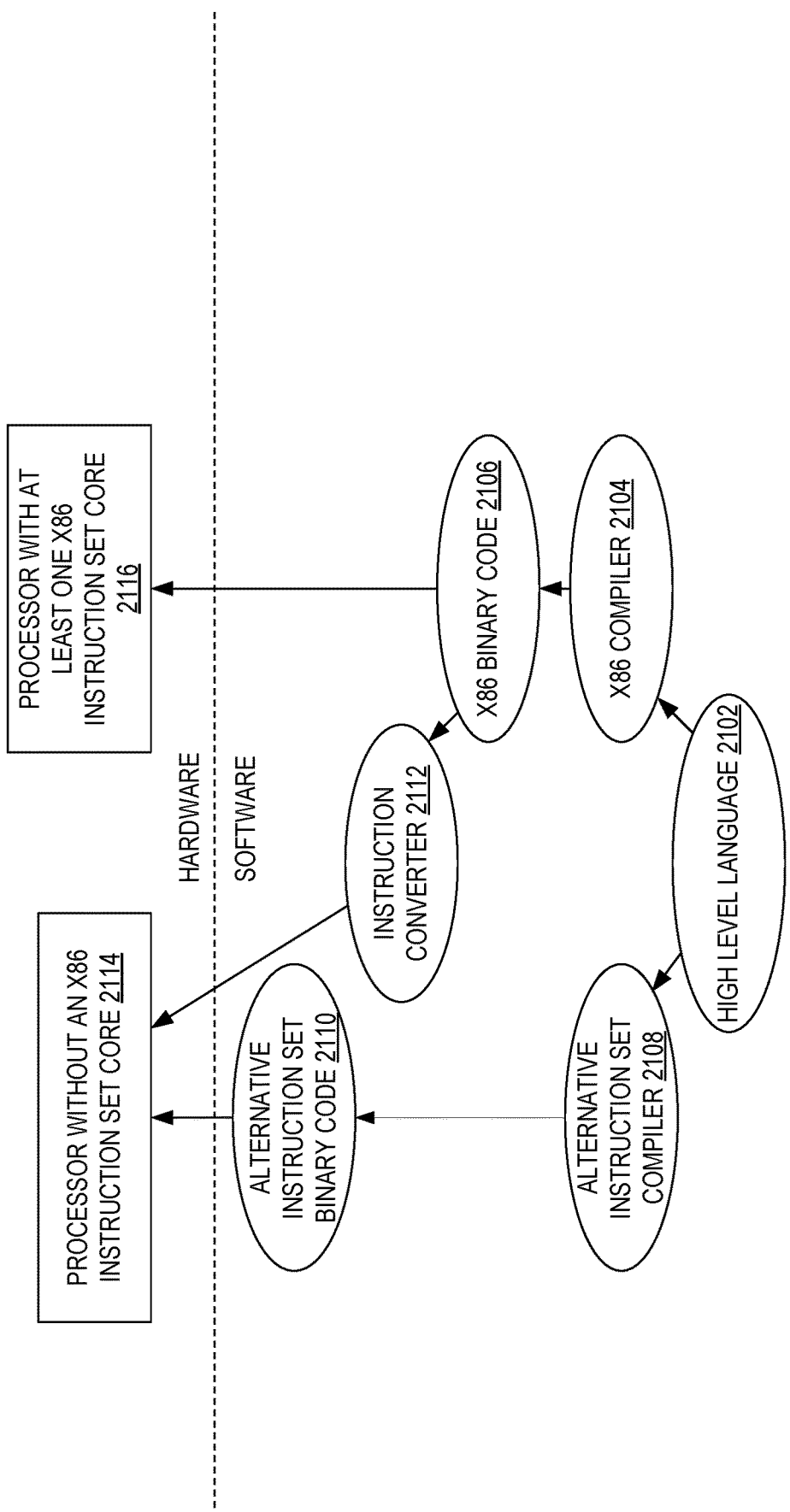
FIG. 21 is a block diagram contrasting the use of a software instruction converter to convert binary instructions in a source instruction set to binary instructions in a target instruction set according to embodiments of the disclosure.

FIG. 21 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, CA and/or that execute the ARM instruction set of ARM Holdings of Sunnyvale, CA). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

What is claimed is:

1. A processor core comprising:
an instruction fetch circuit to fetch instructions;
storage for a data structure comprising a plurality of entries that each include a thread identification (TID) and a privilege level bit; and
a branch predictor, coupled to the instruction fetch circuit and the storage, to predict a target instruction corresponding to a branch instruction based on at least one entry of the plurality of entries in the storage, and cause the target instruction to be fetched by the instruction fetch circuit.

2. The processor core of claim 1, wherein the privilege level bit is selectable between a kernel and a user level.

3. The processor core of claim 2, wherein the plurality of entries each include a software mode identifier.

4. The processor core of claim 1, wherein the plurality of entries each include a software mode identifier.

5. The processor core of claim 1, wherein the branch predictor is to predict the target instruction corresponding to the branch instruction without being controlled by a different privilege domain.

6. The processor core of claim 1, wherein the plurality of entries each include a virtual identification (ID) that differentiates virtual-to-physical mappings in use.

7. The processor core of claim 1, wherein the plurality of entries are for return instructions.

8. The processor core of claim 1, further comprising a key register to store cryptographically sealed assets that indicate a privilege level of executing software.

9. A method comprising:
fetching instructions by an instruction fetch circuit of a hardware processor core;
storing a plurality of entries that each include a thread identification (TID) and a privilege level bit in storage of the hardware processor core; and
predicting, by a branch predictor of the hardware processor core, a target instruction corresponding to a branch instruction based on at least one entry of the plurality of entries in the storage; and
fetching, by the instruction fetch circuit, the target instruction.

10. The method of claim 9, wherein the privilege level bit is selectable between a kernel and a user level.

11. The method of claim 10, wherein the plurality of entries each include a software mode identifier.

12. The method of claim 9, wherein the plurality of entries each include a software mode identifier.

13. The method of claim 9, wherein predicting, by the branch predictor, of the target instruction corresponding to the branch instruction is without the branch predictor being controlled by a different privilege domain.

14. The method of claim 9, wherein the plurality of entries each include a virtual identification (ID) that differentiates virtual-to-physical mappings in use.

15. The method of claim 9, wherein the plurality of entries are for return instructions.

16. The method of claim 9, further comprising reading a key register that stores cryptographically sealed assets that indicate a privilege level of executing software.

17. An apparatus comprising:
an instruction fetch circuit to fetch instructions;
storage for a data structure comprising a plurality of entries that each include a thread identification (TID) and a privilege level bit; and
a branch predictor, coupled to the instruction fetch circuit and the storage, to:
for a match in the storage of a current instruction pointer for a branch instruction to an entry of the plurality of entries in the storage, predict a target instruction corresponding to the branch instruction and cause the target instruction to be fetched by the instruction fetch circuit and,
for no match in the storage of the current instruction pointer to the plurality of entries in the storage, cause a next sequential instruction pointer from the current instruction pointer to be fetched by the instruction fetch circuit.

18. The apparatus of claim 17, wherein the privilege level bit is selectable between a kernel and a user level.

19. The apparatus of claim 18, wherein the plurality of entries each include a software mode identifier.

20. The apparatus of claim 17, wherein the plurality of entries each include a software mode identifier.

21. The apparatus of claim 17, wherein the branch predictor is to predict the target instruction corresponding to the branch instruction without being controlled by a different privilege domain.

22. The apparatus of claim 17, wherein the plurality of entries each include a virtual identification (ID) that differentiates virtual-to-physical mappings in use.

23. The apparatus of claim 17, wherein the plurality of entries are for return instructions.

24. The apparatus of claim 17, further comprising a key register to store cryptographically sealed assets that indicate a privilege level of executing software.

* * * * *